(12) United States Patent
Jacobs et al.

(10) Patent No.: US 12,366,936 B2
(45) Date of Patent: Jul. 22, 2025

(54) CONTROL MECHANISM FOR TOUCHSCREEN INTERFACE

(71) Applicant: Rivian IP Holdings, LLC, Plymouth, MI (US)

(72) Inventors: Chris Marshall Jacobs, Palo Alto, CA (US); Patrick Harrington, San Francisco, CA (US); Jaekyun Kang, Sunnyvale, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/078,023

(22) Filed: Dec. 8, 2022

(65) Prior Publication Data

US 2024/0192795 A1    Jun. 13, 2024

(51) Int. Cl.
| | |
|---|---|
| *G06F 3/041* | (2006.01) |
| *G06F 3/0338* | (2013.01) |
| *G06F 3/0362* | (2013.01) |
| *G06F 3/044* | (2006.01) |
| *G06F 3/04886* | (2022.01) |

(52) U.S. Cl.
CPC .......... *G06F 3/0416* (2013.01); *G06F 3/0338* (2013.01); *G06F 3/0362* (2013.01); *G06F 3/044* (2013.01); *G06F 3/04886* (2013.01); *G06F 2203/04107* (2013.01); *G06F 2203/04803* (2013.01)

(58) Field of Classification Search
CPC ...... G06F 3/041; G06F 3/0416; G06F 3/0338; G06F 3/0362; G06F 3/044; G06F 3/04886; G06F 2203/04107; G06F 2203/048
USPC ................................................. 345/173–174
See application file for complete search history.

(56) References Cited

U.S. PATENT DOCUMENTS

| | | | | |
|---|---|---|---|---|
| 2009/0085894 | A1* | 4/2009 | Gandhi | G06F 3/0445 345/175 |
| 2011/0234502 | A1* | 9/2011 | Yun | G09B 21/003 345/173 |
| 2011/0273389 | A1* | 11/2011 | Hibara | G06F 3/04186 345/173 |
| 2016/0361662 | A1* | 12/2016 | Karunaratne | G06F 3/038 |
| 2018/0345988 | A1* | 12/2018 | Mimura | B60W 50/08 |
| 2022/0374084 | A1* | 11/2022 | Orita | G06F 3/0383 |

FOREIGN PATENT DOCUMENTS

| | | | | |
|---|---|---|---|---|
| WO | WO-2016040279 A1 * | 3/2016 | ......... | A63F 13/2145 |

OTHER PUBLICATIONS

Price, Emily. (Oct. 23, 2014). "Control an iPad with Gorgeous Physical Buttons", Popular Mechanics, located at: bhttps://www.popularmechanics.com/technology/gadgets/a11429/this-guy-built-a-tactile-interface-over-the-ipad-17345703/.

* cited by examiner

*Primary Examiner* — Kwin Xie
(74) *Attorney, Agent, or Firm* — Patterson + Sheridan, LLP

(57) ABSTRACT

Particular embodiments may provide a device and process for using a device to control a functionality of a computing device. The device may include a control mechanism that can contact a touchscreen based on a user invocation. The control mechanism may include conductive elements that contact a surface of the control mechanism. A user may physically interact with the control mechanism to cause the control mechanism to contact the touchscreen at a location. The location may correspond to a function of a computer program executing on the computing device.

20 Claims, 28 Drawing Sheets

CONTROL MECHANISM FOR TOUCHSCREEN INTERFACE

INTRODUCTION

Modern vehicles typically include a digital display for presenting content to a vehicle operator. Some digital displays include touchscreens that allow the vehicle operator to interface with the content. As vehicles become more intelligent, traditional input mechanisms (e.g., mechanical knobs and/or buttons) are being replaced with graphical user interfaces (GUIs). These GUIs enable certain functionalities of the vehicle to be controlled (e.g., volume adjustment, media selection) by the vehicle operator via directly contacting a touchscreen to interface with the GUIs.

BRIEF SUMMARY

Described herein are control mechanisms and methods, systems, and programming for using control mechanisms in conjunction with touchscreens to control certain functionalities of a vehicle. While many functionalities can be accessed and controlled directly via a graphical user interface (GUI) rendered on the touchscreen, certain functionalities may benefit from having a physical control mechanism available. For example, controlling a winch using a touchscreen may be difficult, particularly if a vehicle operator's hands are wet, which makes them difficult for the touchscreen to detect. Some embodiments include control mechanisms that can be detected by the touchscreen and used to control certain functionalities of the vehicle or user device. The control mechanisms may couple to the touchscreen (e.g., via conductive elements). In some embodiments, the control mechanism may be fixedly coupled to a touchscreen. The control mechanism can be attached to the touchscreen quickly and easily, while also being able to be removed without damaging the touchscreen. Furthermore, some embodiments include content being rendered in a region of the GUI based on the functionality to be controlled by the control mechanism, the type of control mechanism that is used, or other factors.

In some embodiments, a device may include a control mechanism configured to contact a touchscreen of a computing device based on a user invoking the control mechanism. The control mechanism may include: at least one conductive element on a first surface of the control mechanism. The conductive element may be capable of activating capacitive touch sensors of the touchscreen. The user may physically interact with the control mechanism to cause the at least one conductive element to contact a first location on the touchscreen. The first location may correspond to a respective function of a computer program executing on a computing device including the touchscreen.

In some embodiments, the control mechanism may further include a projection element configured to project content rendered by the touchscreen to an exterior surface of the projection element.

In some embodiments, the projection element may be formed of a fiber optic material having optical enhancement characteristics configured to enhance a visibility of the content to the exterior surface.

In some embodiments, the control mechanism contacting the touchscreen may cause content to be displayed on the touchscreen in a region surrounding the control mechanism.

In some embodiments, the device may further include: a mounting system configured to fixedly couple to the computing device. The control mechanism may be disposed within the mounting system.

In some embodiments, the mounting system may further include: one or more conductive elements disposed on an inner surface of the mounting system. The conductive elements may be configured to contact the touchscreen, and the function of the computer program may be determined based on a location of each of the one or more conductive elements on the touchscreen.

In some embodiments, the touchscreen may display first content based on the one or more conductive elements being determined to contact the touchscreen at a first location along the touchscreen. The touchscreen may display second content based on the one or more conductive elements being determined to contact the touchscreen at a second location along the touchscreen. The mounting system may be capable of being moved about the touchscreen to cause the one or more conductive elements to move from the first location to the second location.

In some embodiments, the control mechanism may further include: an adhesive affixed to the at least one conductive element to fixedly couple the control mechanism to the touchscreen.

In some embodiments, at least a portion of the control mechanism may be formed of a non-conductive material, and the at least one conductive element may be integrated with the non-conductive material.

In some embodiments, the control mechanism may be a toggle capable of switching between a first position and a second position, a knob configured to be twisted from a first angular position to a second angular position, or a button capable of being depressed to cause the at least one conductive element to contact the touchscreen.

In some embodiments, the function of the computer program may be determined based on at least one of: a quantity of conductive elements or a position of each conductive element disposed along a perimeter of the control mechanism.

In some embodiments, a computer-implemented method may include: detecting a set of conductive elements contacting a touchscreen at a first location; identifying a control mechanism associated with the set of conductive elements based on the first location and the set of conductive elements; determining a functionality of a computing device with which to provide access via the touchscreen based on the identified control mechanism; and causing content to be rendered by the touchscreen. The content may be associated with the functionality. A first region of the touchscreen with which the content is rendered may be based on the first location.

In some embodiments, the first region may include an area of the touchscreen covered by the control mechanism; or the first region may include an exterior of the control mechanism.

In some embodiments, the content may be formatted such that it is projected via a projection mechanism to an exterior surface of the control mechanism.

In some embodiments, the method may further include: detecting the set of conductive elements contacting a second location along the touchscreen; and causing the content to be rendered at a second region of the touchscreen based on the second location.

In some embodiments, the method may further include: determining an orientation of the control mechanism based on the first location and the set of conductive elements;

detecting that a point of contact of each conductive element of the set rotated about an axis defined by the first location; and causing the content to be adjusted based on an angular displacement of each conductive element.

In some embodiments, the method may further include: detecting an additional set of conductive elements contacting a respective set of second locations along the touchscreen. The additional set of conductive elements may be associated with a mounting system for mounting the control mechanism to the touchscreen. At least one of the control mechanism, the functionality, or the content may be determined based on the additional set of conductive elements.

In some embodiments, the control mechanism may include a button, a toggle, a knob, or a joystick.

In some embodiments, the method may further include: determining that the control mechanism has moved about the touchscreen based on the set of conductive elements being detected at a second location along the touchscreen; computing a distance that the control mechanism moved based on the first location and the second location; and causing, based on the distance being less than or equal to a threshold distance, the content to be rendered at a second region of the touchscreen. The second region may be associated with the second location.

In some embodiments, a vehicle system may include: a touchscreen; a control mechanism configured to activate the touchscreen based on a user moving the control mechanism in contact with the touchscreen a plurality of processors; and one or more computer-readable non-transitory storage media coupled to one or more of the processors and comprising instructions operable when executed by one or more of the processors. The control mechanism may include: at least one conductive element on a first surface of the control mechanism. The conductive element may be capable of activating capacitive touch sensors of the touchscreen. The user may physically interact with the control mechanism to cause the at least one conductive element to contact a first location on the touchscreen. The first location may correspond to a respective function of a computer program executing on a computing device comprising the touchscreen. The instructions being executed by the processors may cause the vehicle system to: detect a set of conductive elements contacting a touchscreen at a first location; identify a control mechanism associated with the set of conductive elements based on the first location and the set of conductive elements; determine a functionality of the computing device with which to provide access via the touchscreen based on the identified control mechanism; and cause content to be rendered by the touchscreen. The content may be associated with the functionality. A region of the touchscreen with which the content is rendered may be based on the first location.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1A:
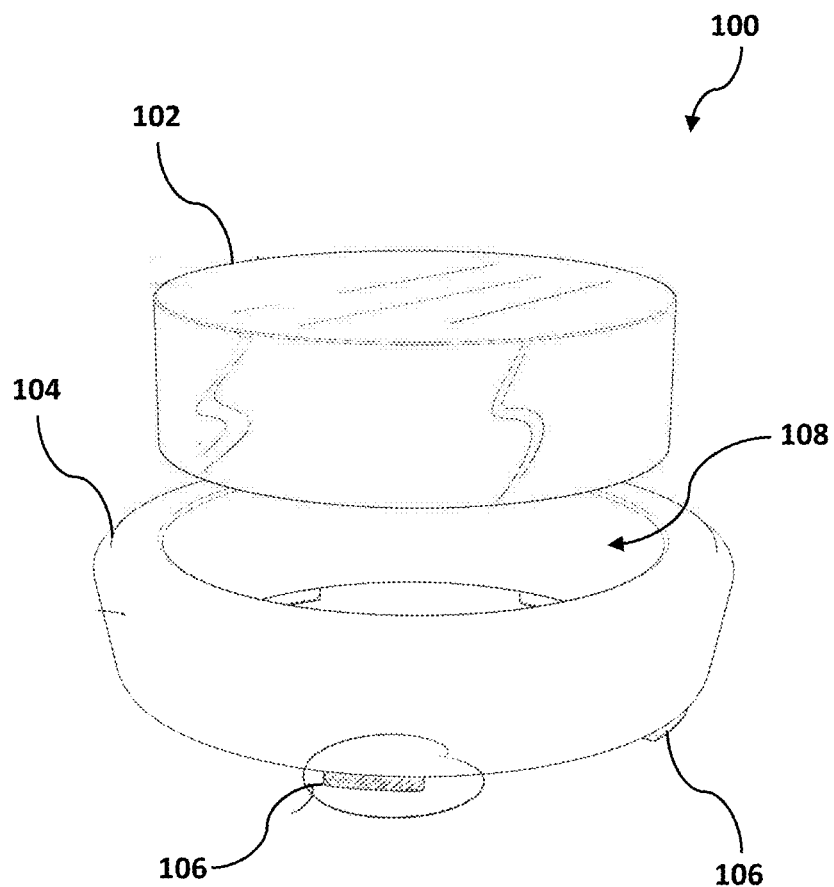
FIGS. 1A-1C illustrate schematic diagrams of an example control mechanism, in accordance with various embodiments.

Vehicles traditionally include control mechanisms, such as knobs, buttons, sliders, and the like, which allow vehicle operators to interact with the vehicle. A vehicle operator may use the control mechanisms to invoke a particular functionality of the vehicle, as well as, or alternatively, control a setting, aspect, and/or feature associated with the selected functionality. For example, a vehicle operator may press a button to turn a stereo system on, and may turn a knob of the stereo system to adjust a volume of audio output by the stereo system.

Recently, vehicles have begun to incorporate user devices. Some vehicles enable a user device to be communicably coupled to the vehicle, such as via a USB connection. Some vehicles have user devices integrated therein, such as a vehicle include a multi-media system. Some of the user devices include touchscreens, which may replace some of the functionalities previously controlled using a physical control mechanism. For example, an air temperature of a vehicle's heating/cooling system may be controlled using a knob or slider (e.g., sliding the slider in one direction can raise a temperature of the air output from the heating/cooling system while sliding the slider in another direction can lower the temperature of the output air). However, some vehicles may allow a user to adjust the temperature of the air using a GUI rendered on a touchscreen of the vehicle.

While some newer vehicles offer users features that older vehicles do not (e.g., improved fuel economy, improved safety, directions), there can be certain situations where a physical control mechanism (e.g., a knob) can improve user experience when compared to a digital control mechanism (e.g., a button displayed within a GUI rendered by a touchscreen). For example, the vehicle may include a winch/pulley system that allows the vehicle to pull an object. Controlling the winch using a touchscreen interface can be difficult, particularly if the vehicle operator has wet or dirty hands as that can affect the touchscreen's ability to detect the capacitance change resulting from the vehicle operator's finger(s) contacting the touchscreen. In such situations, a physical control mechanism may improve user experience, as well as increase the safety of using the winch/pulley system, by providing additional haptic control of the winch/pulley system. Therefore, technical problems exist when trying to marry the traditional physical control mechanisms with modern touchscreen controls.

Described herein are technical solutions to the aforementioned technical problems. In particular, described herein are control mechanisms that can be used with touchscreens, such as those included within a vehicle. Furthermore, described herein are techniques for detecting a control mechanism contacting a touchscreen, identifying functionalities that can be used/provided based on the detected control mechanism, rendering content via the touchscreen based on the functionalities, and adjusting/modifying the content based on an orientation and/or location of the control mechanism with respect to the touchscreen.

In some embodiments, the control mechanism may be placed on a surface of a touchscreen of a user device. The user device may itself be a connected vehicle (e.g., a vehicle that connects, via a communications network, to one or more other vehicles, a server, or other computing devices), or may be incorporated into a vehicle (e.g., a smartphone that is capable of being communicably connected to the vehicle). The touchscreen may be configured to detect the control mechanism based on a number of conductive elements contacting the touchscreen, a location that each conductive element is contacting the touchscreen, a pattern of the conductive elements, or a size/shape/configuration (or other characteristics) of the conductive elements.

The user device may be configured to identify a control mechanism or type of control mechanism associated with the conductive elements that were detected contacting the touchscreen. The control mechanism (or type thereof) may be identified based on the location that the conductive elements are contacting the touchscreen. The location may refer to a coordinate position of each conductive element that contacts the touchscreen, as well as, or alternatively, a computed anchor point of the control mechanism with respect to the touchscreen. For example, if the control mechanism includes three (3) conductive elements located along a circle at even spacing, the touchscreen may detect a coordinate location of each conductive element relative to a coordinate system of the trace lines composing the touchscreen. As another example, for a control mechanism including three conductive elements, the user device including the touchscreen may compute a distance between each conductive element based on the coordinate locations, and may calculate a "center-of-mass" of the control mechanism based on each conductive element's coordinate location. The particular control mechanism and/or type of control mechanism may be identified therefore based on the characteristics of the conductive elements (e.g., a number of conductive elements, size, shape, frequency, etc.) as well as the coordinate locations/anchor point. For instance, a control mechanism including three conductive elements placed along a circle at even spacing may be identified as corresponding to a knob (e.g., a mechanical element capable of being rotated).

The particular control mechanism or the particular type of control mechanism may also be identified. For instance, the size, shape, pattern, quantity, or other characteristics of the conductive elements may uniquely identify the control mechanism. In some embodiments, the control mechanism may include an identification device, such as an RFID, NFC device, or other tag, that can be detected by the user device and used to determine a particular control mechanism or type of control mechanism.

In some embodiments, the user device is a computing device including processing capabilities, memory, network interfaces, and the like. The user device may be a standalone computing device, such as a smartphone, tablet, laptop, or other computing system, or combination thereof. In some embodiments, the user device may be incorporated into another system/device, such as a connected vehicle. As an illustrative example, a connected vehicle may include a vehicle that has a computing device integrated therein or that communicatively couples thereto to control one or more functionalities of the vehicle. For example, connected vehicles may be capable of providing navigation functionalities to a vehicle operator, providing telephone/messaging functionality, displaying media (e.g., digital images and/or videos), and the like. As defined herein, a vehicle refers to a mode of transportation. Some example vehicles include, but are not limited to, automobiles, trucks (such as delivery trucks, mail trucks, fire trucks, etc.), sport utility vehicles (SUVs), buses, vans, construction vehicles, ambulances, airplanes, helicopters, boats and/or other aquatic vehicles, land/sea vehicles, motorcycles, and the like.

In some embodiments, a functionality of a user device (e.g., a user device that includes the touchscreen) may be determined based on the identified control mechanism. For example, based on the size, shape, arrangement, quantity, etc., of the conductive elements detected, the user device may determine that a knob has been placed on a surface of the touchscreen. The user device may determine that a predefined set of functionalities are available for use with the identified control mechanism (e.g., a knob). For example, a radio frequency control, air temperature control, winch/pulley control, or other functionality may be operated using a knob-type control mechanism. In some embodiments, multiple control mechanisms may be placed on the touchscreen. For example, two or more knob-type control mechanisms may be placed on the touchscreen. The multiple control mechanisms may be of a same type (e.g., both knobs) or of different types (e.g., one knob, one slider). The multiple control mechanisms may be of a same type but may be different sizes. As an example, a first control mechanism and a second control mechanism may be placed on the touchscreen. The first control mechanism may be configured to facilitate of a first function of the computer program being executed on the computing device including the touchscreen, and the second control mechanism may be configured to facilitate a second function of the computer program being executed on the computing device.

In some embodiments, content may be rendered by the touchscreen based on the functionality that was determined to be associated with the control mechanism. For example, if the control mechanism is a knob, then a radio frequency may be controlled with the knob, and a GUI depicting content for controlling the radio frequency (e.g., images of various radio frequencies that a radio of the vehicle can be programmed to) may be rendered by the touchscreen. In some embodiments, a region of the touchscreen (e.g., a subset of pixels) may have the content rendered thereon based on the location of the conductive elements of the control mechanism. For example, the content may be rendered on a "right" side of the touchscreen based on the control mechanism being detected on a "left" side of the touchscreen.

In some embodiments, the control mechanism is a physical object having a variety of forms. For example, the control mechanism may be a knob, a button, a switch, a slider, a joystick, a keypad, a keyboard, a stylus, or other device capable of being actuated to control one or more functionalities of a device.

Figure 1B:
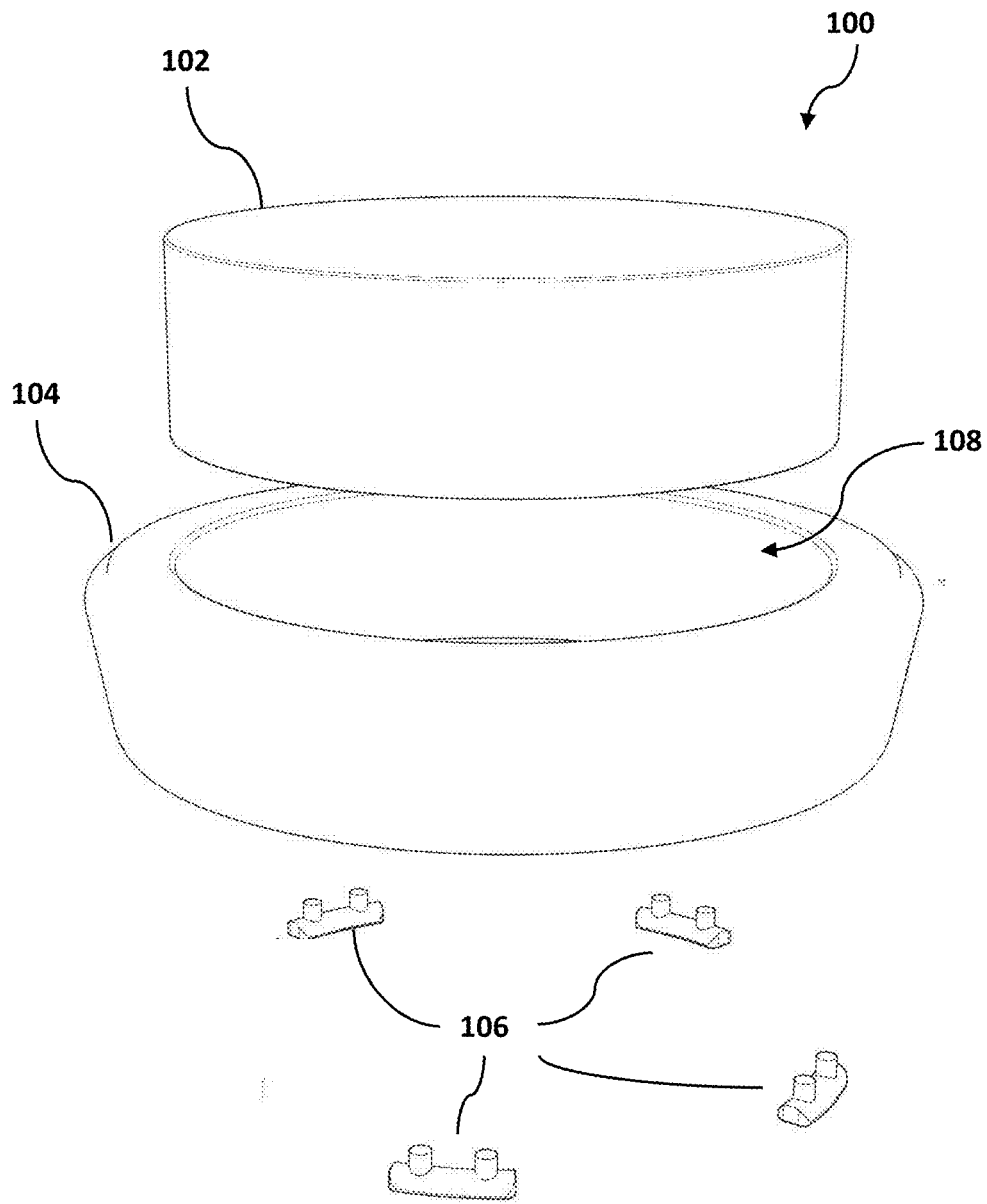
Figure 1C:
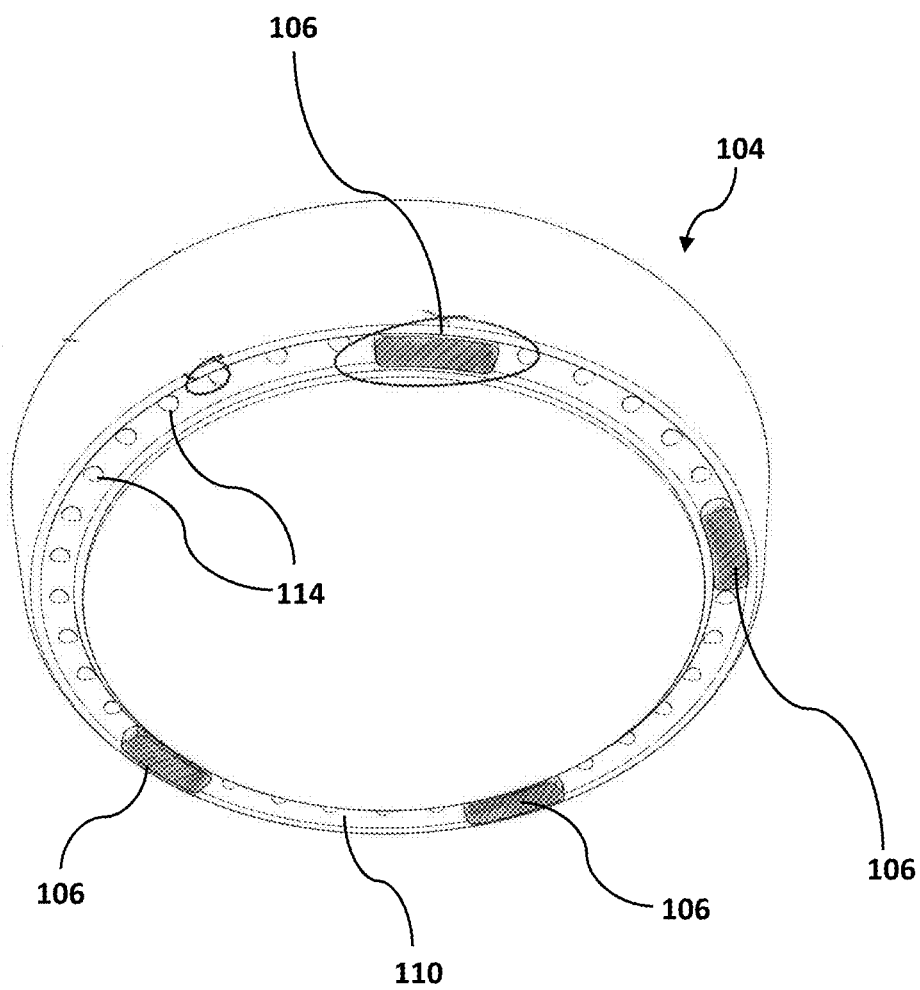

FIGS. 1A-1C illustrate schematic diagrams of an example control mechanism, in accordance with various embodiments. FIGS. 1A-1C illustrate an example control mechanism 100. Control mechanism 100 may include a projection element 102, a support element 104, and one or more conductive elements 106. Control mechanism 100 is illustrated as being circular, however aspects of the embodiments described herein may apply equally to control mechanisms of other shapes, sizes, and patterns. For example, control mechanism 100 may have a length or diameter of 2 mm or more, 5 mm or more, 1 cm or more, 5 cm or more, etc. The size of control mechanism 100 may depend on a size of a touchscreen with which control mechanism 100 is to be placed. Furthermore, while the illustrated embodiments depict control mechanisms and other components having smooth surfaces, some embodiments include one or more surfaces of a control mechanism or other component having different textures (e.g., rough, soft, bumpy) or with other tactile elements.

Conductive elements 106 may be formed of a conductive material, such as copper, aluminum, or other materials, or combinations thereof. Conductive elements 106 may take on various shapes, sizes, arrangements, or patterns, and the embodiments described herein are illustrative examples. In some embodiments, conductive elements 106 may be integrated within support element 104, or affixed to a surface of support element 104 that is configured to contact the touchscreen. Conductive elements 106 may have a particular conductivity level suitable to be detected by a touchscreen. The concentration of the conductive material(s) within conductive elements 106 may depend on the conductivity level.

In some embodiments, conductive elements 106 may be removable from support element 104, and thus control mechanism 100. For example, conductive elements 106 can be attached, removed, re-attached, etc., to support element 104. In some embodiments, a number of conductive elements 106 may vary depending on one or more of the type of control mechanism, a size of the control mechanism, or a material composition of the conductive elements. The number of conductive elements 106 may also be changed (e.g., more conductive elements or fewer conductive elements). Furthermore, different conductive elements may be used for the control mechanism instead of, or in addition to, conductive elements 106.

In some embodiments, conductive elements 106 may have an additional layer of material applied to a surface that will contact the touchscreen (e.g., the glass surface). For example, a layer of an electrostatic discharge foam may line a surface of conductive element 106 to protect the touchscreen from being damaged when conductive elements 106 contact the surface. In some embodiments, conductive elements 106 may have yet another additional layer of material applied to its surface to allow control mechanism 100 to mechanically or electromagnetically attach to the touchscreen. For example, a nano-tape may be applied to conductive element 106 to allow control mechanism 100 to mechanically couple to the touchscreen. Additionally, the additional layer may also enable easy detachment from the touchscreen surface without leaving any residual material.

In some embodiments, conductive elements 106 may be affixed to a surface of support element 104 such that conductive elements 106 contact a touchscreen during operation. For example, conductive elements 106 may be affixed using an adhesive. As another example, conductive elements 106 may be affixed to support element 104 using a pressure fit. For example, with reference to FIG. 1C, support element 104 may have a channel 110 located along a first (e.g., lower) surface—corresponding to a surface that is to face a touchscreen's surface when control mechanism is placed thereon. Channel 110 may be recessed into a body of support element 104, however, this is not required. In some embodiments, channel 110 may include a number of holes 114. The number, size, spacing, and shape of holes 114 may vary depending on the control mechanism. For example, holes 114 may be circular, rectangular, oblong, or other shapes, or combinations of shapes. Holes 114 may have a size (e.g., a diameter, a width, a depth, a length, etc.) between 0.01-1.0 cm, and any suitable number of holes 114 may be included (e.g., one or more, ten or more, thirty-six or more, sixty-four or more, and the like). In some embodiments, holes 114 may be evenly spaced about channel 110 (e.g., each hole is equidistant to its adjacent hole), however some embodiments may include clusters of holes 114 along one or more sections of channel 110.

In some embodiments, support element 104 may have a ring-shape. For example, as seen from FIG. 1B, support element 104 may include cavity 108 whereby projection element 102 may be disposed. Projection element 102 may shaped such that it rests within cavity 108. In some embodiments, projection element 102 may be affixed to support element 104 using an adhesive material and/or via a pressure fit.

In some embodiments, projection element 102 may be formed of an optical material that is configured to project an image from one end of projection element 102 to the other end. For example, projection element 102 may be formed of glass, or other fiber optic materials. Projection element 102 may have fabricated to cause a magnification of images. For example, the touchscreen may be configured to display content at a location on the touchscreen based on the location that conductive elements 106 are contacting the touchscreen. The displayed content may be magnified and projected through projection element 102 towards an outer surface of projection element 102. In this way, content rendered on the touchscreen can be projected to the exterior surface of projection element 102 so that an operator can see the content while interacting with control mechanism 100. For example, control mechanism 100 may be used to raise a volume of a stereo system. A volume level (e.g., a number between 0-10) may be displayed on the touchscreen at a location where control mechanism 100 contacts the touchscreen. An image depicting the volume level (e.g., the number "5") may be rendered on the touchscreen and projected to an upper surface of projection element 102 such that the operator can view the volume level while actuating control mechanism 100. The touchscreen may be of any suitable size and/or shape, and some embodiments may include multiple touchscreens. As an example, the touchscreen may have a length (e.g., along a diagonal of the screen) of 1 cm or more, 10 cm or more, 25 cm or more, 50 cm or more, or other sizes.

In some embodiments, control mechanism 100 may include one or more identification devices, such as an RFID tag, an NFC device, network interfaces, or other tags, or combinations thereof. The identification devices may be configured to communicate data with one or more user devices, such as a computing system of a connected vehicle.

Figure 2A:
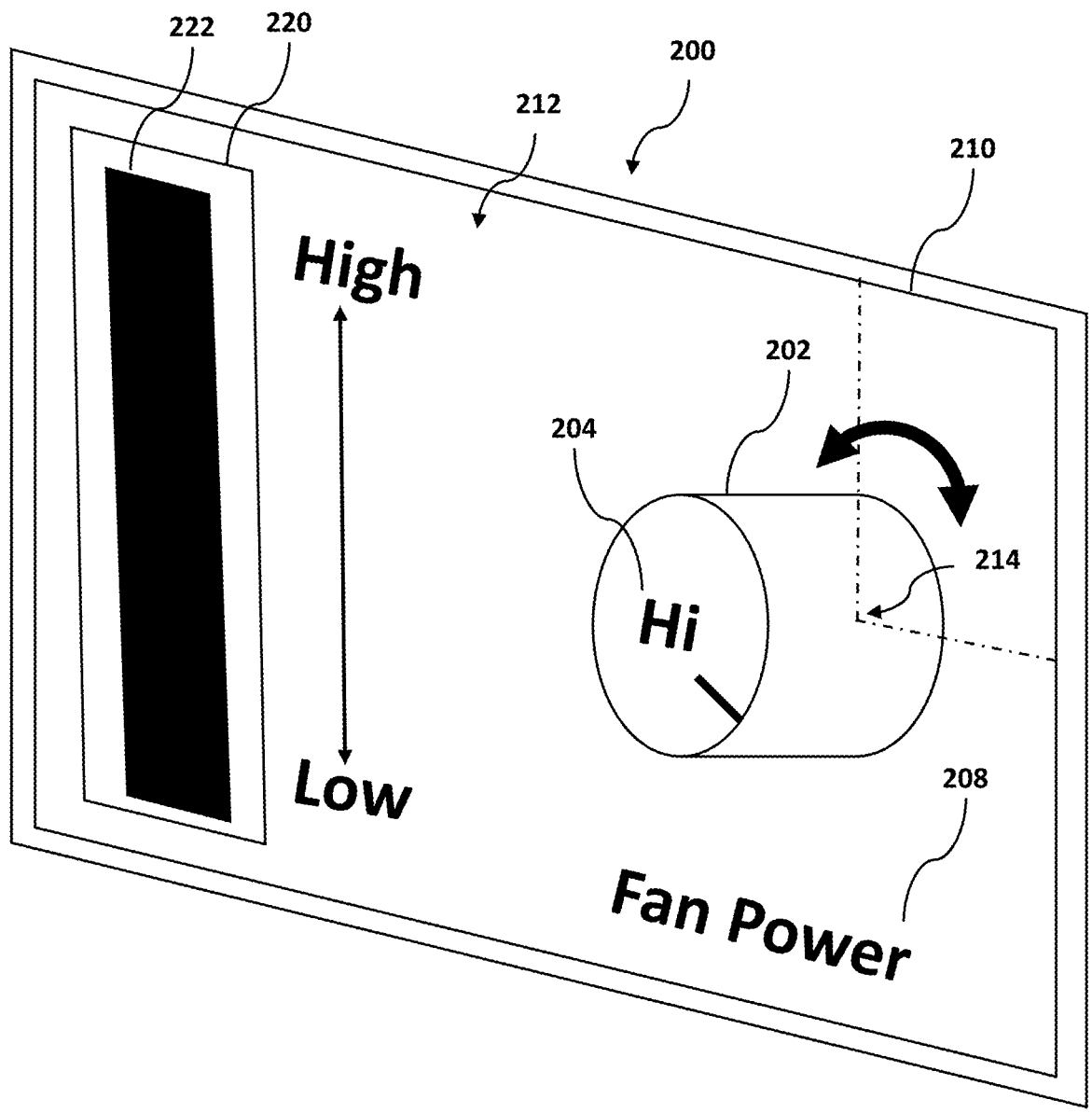
FIGS. 2A-2C illustrate schematic diagrams of example content rendered via a touchscreen based on a control mechanism contacting the touchscreen, in accordance with various embodiments.
Figure 2B:
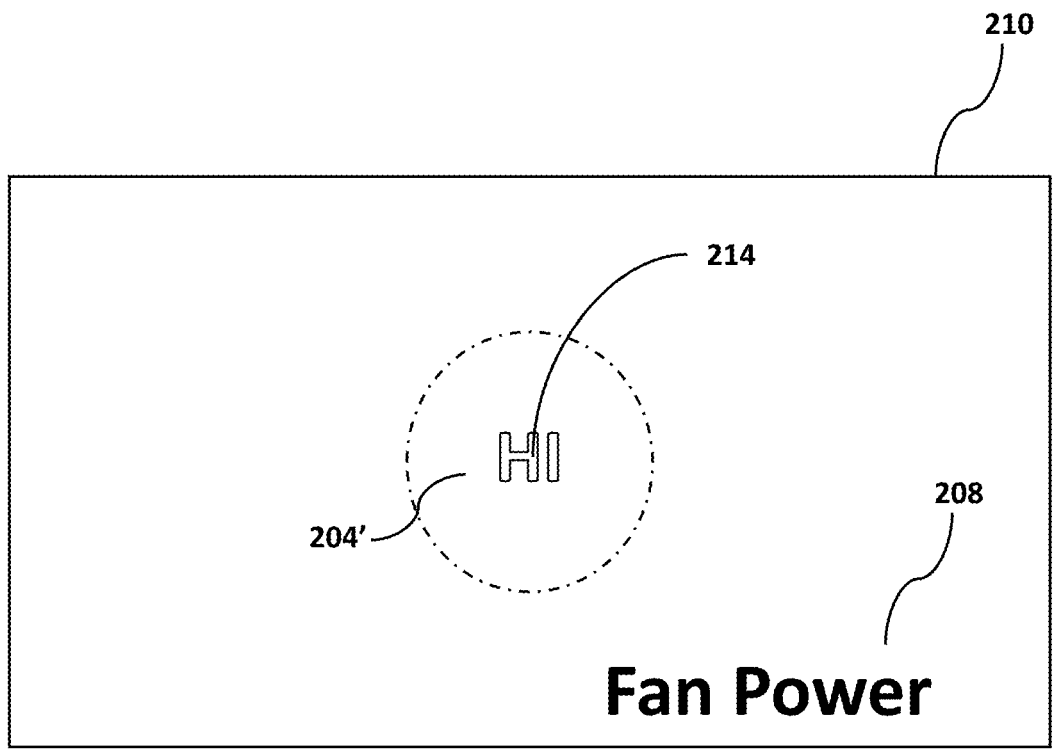
Figure 2C:
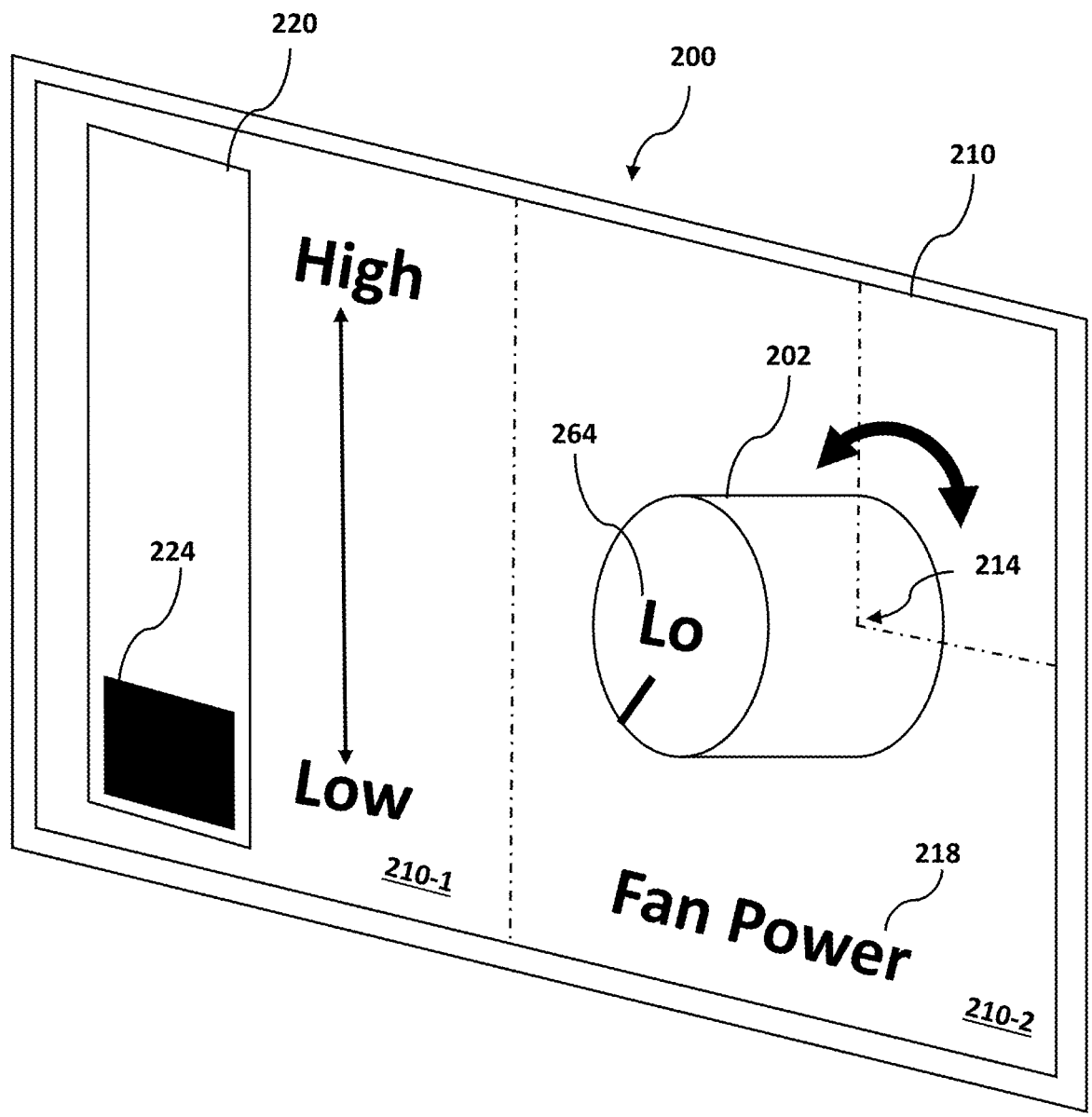

FIGS. 2A-2C illustrate schematic diagrams of example content rendered via a touchscreen based on a control mechanism contacting the touchscreen, in accordance with various embodiments. FIG. 2A depicts an example user device 200 including a touchscreen 210 that a control mechanism 202 may contact. In some embodiments, control mechanism 202 may be detected by user device 200 based on touchscreen 210 determining that one or more conductive elements are contacting touchscreen 210. In some embodiments, user device 200 is, or is integrated within, a connected vehicle, such as a vehicle capable of communicating with one or more computing systems. For example, user device 200 may form part of a human-machine interface (HMI) of a vehicle that allows a vehicle operator to control one or more functionalities of the vehicle (e.g., radio, driving directions, air temperature, etc.). In some embodiments, user device 200 may determine a location along touchscreen 210 where control mechanism 202 is contacting touchscreen 210. For example, user device 200 may determine a coordinate location along touchscreen 210 where each conductive element (e.g., conductive elements 106) contacts touchscreen 210. User device 200 may be configured to monitor touchscreen 210 to determine whether there is a change in a capacitance at a particular point or points on touchscreen 210. The changes in capacitance may indicate that an object (e.g., a human finger, stylus, control mechanism, etc.) is contacting the touchscreen.

In some embodiments, user device 200 may identify a type of control mechanism or a particular control mechanism contacting touchscreen 210. For example, based on the configuration of the conductive elements contacting touchscreen 210, user device 200 may determine that control mechanism 202 (e.g., a circular knob-like structure) is contacting touchscreen 210 at a first location 214. In some embodiments, multiple control mechanisms may be contacting touchscreen 210. User device 200 may identify a type of each control mechanism contacting touchscreen 210 and/or may identify the particular control mechanisms that are contacting touchscreen 210. For example, two or more instances of control mechanism 202 may be contacting touchscreen 202. As another example, two different types of control mechanisms may contact touchscreen 210. The multiple control mechanisms may be of a same type (e.g., both knobs) or of different types (e.g., one knob, one slider). The multiple control mechanisms may be of a same type but may be different sizes. As an example, a first control mechanism and a second control mechanism may be placed on the touchscreen. The first control mechanism may be configured to facilitate of a first function of the computer program being executed on the computing device including the touchscreen, and the second control mechanism may be configured to facilitate a second function of the computer program being executed on the computing device. In some embodiments, first location 214 may refer to an anchor point of control mechanism 202 indicating a center of control mechanism 202. For example, based on a location of each conductive element, user device 200 may resolve a center point of control mechanism 202 that is contacting (or is proximate to a surface of) touchscreen 210. Using the center point (e.g., first location 214) and/or the contact point of each conductive element, user device 200 may determine a type of control mechanism contacting touchscreen 210. For example, based on the conductive elements (e.g., conductive elements 106), user device 200 may determine that control mechanism 202 is a knob that can be rotated about a central axis (e.g., an axis projecting out from touchscreen 210 at first location 214).

It should be noted that control mechanism 202 may not be a permanent fixture of user device 200. For example, control mechanism 202 may affix to touchscreen 210 via an adhesive (e.g., nano-tape), electromagnetic coupling, or by other coupling techniques. Therefore, control mechanism 202 may be removed from contacting touchscreen 210 without damaging touchscreen 210. Furthermore, control mechanism 202 can be adjusted (e.g., rotated, pressed, etc.) about its contact point(s), as well as, or alternatively, moved to other locations on touchscreen 210.

In some embodiments, user device 200 may determine a functionality to be invoked based on the control mechanism identified as contacting touchscreen 210. Certain functionalities of user device 200 may be controllable using a particular type of control mechanism, while other functionalities may be controllable using a different type of control mechanism. For example, a knob-type control mechanism (e.g., control mechanism 202) may enable a user to control functionalities such as an air temperature of a heating/cooling system, a volume setting of a media/stereo system, a directionality of a winch's movement for a winch/pulley system, and the like. As another example, a button-type control mechanism may enable a user to control other functionalities, such as turning the heating/cooling system on or off, changing the media/stereo system from broadcasting AM radio to FM radio (or satellite radio), locking or unlocking a vehicle, and the like.

In FIG. 2A, user device 200 may determine that control mechanism 202 is a knob-type device, and may cause certain content to be rendered. For example, control mechanism 202 may be used to control a power/flux of air emanating from the heating/cooling system by rotating control mechanism 202 about a center axis defined by an anchor point located at first location 214. Thus, user device 200 may cause content 212 to be rendered via touchscreen 210 to enable a user to control certain functionalities, such as whether the power/flux of air should be increased, decreased, or left static. In some embodiments, a user may invoke one or more physical buttons or digital buttons displayed on touchscreen 210 to cause user device 200 to enter a certain mode whereby a certain set of functionalities are available. For example, a user may select a button to access the heating/ cooling system. Based on the selection, user device 200 may determine what content to render. In some embodiments, user device 200 may further select additional or subsequent content (e.g., content 212) to render based on control mechanism 202. For example, the user may have invoked the heating/cooling system and then placed control mechanism 202 on touchscreen 210, which can result in user device 200 determining that content 212 should be rendered. This may be based on the functionalities of the selected mode (e.g., the heating/cooling system). For example, the heating/cooling system may have a predefined set of functionalities available for a user to access. Of those functionalities, one (or more) may be controllable using control mechanism 202 (e.g., a knob-like device). Therefore, user device 200 may determine that the user seeks to control the power/flux of air from the heating/cooling system and may render content 212 in response.

Content 212 may be a GUI including various indicators. For example, content 212 may include a second display element 220 presented within a first region of touchscreen 210 (e.g., a "left" side of the touchscreen). Second display element 220 may include a bar or other indicator 222 that pictorially represents the air power/flux level. As yet another example, content 212 may include a functionality indicator 208 that pictorially represents the invoked functionality. In the illustrated example, the functionality is "Fan Power," however alternative phrasing, representations, or both, may be used to depict the invoked functionality. Further still, some embodiments include no content.

In some embodiments, content 212 may include an image displayed within a region of touchscreen 210 where control mechanism 202 is located. The displayed image may correspond to information to be projected by and displayed on an outer surface of control mechanism 202. For example, image representation 204 represents a projection of an image displayed on touchscreen 210. As an example, with reference to FIG. 2B, image 204' may be displayed directly on touchscreen 210. Control mechanism 202, when placed on touchscreen 210 at first location 214, may be configured to project image representation 204, which may be a version of image 204' displayed below. For example, control mechanism 202 may have optical properties that magnify, clarify, transmit, or otherwise enhance image 204' so that the operator of control mechanism 202 views image representation 204 instead of image 204'. The region of touchscreen 210 where image 204' is to be rendered (as well as the regions where other visual indicators are to be displayed) may be based on the functionality with which access is being provided and/or a location of control mechanism 202 relative to a surface of touchscreen 210 (e.g., the anchor point at first location 214). For example, user device 200 may determine a size/shape of control mechanism 202 based on conductive elements 106 located thereon, calculate where the anchor point is, determine a size/shape of the content to be rendered, and select a subset of pixels of touchscreen 210 that will be used to render image 204'.

As mentioned above, a user (e.g., a vehicle operator) may control the selected functionality (e.g., air power/flux control) using control mechanism 202. In some embodiments, the user may rotate control mechanism 202 about an axis defined by the anchor point to cause a feature of the functionality to change and/or perform a particular action. For instance, with the air power/flux control functionality, control mechanism 202 may be rotated counter-clockwise to change the air power/flux level from a first level (e.g., "Hi") to a second level (e.g., "Lo"), as seen, for example, in FIG. 2C. In the illustrated embodiment of FIG. 2C, control mechanism 202 located on user device 200 may be configured to cause image representation 264 to be projected to the outer surface of control mechanism 202 such that it is viewable to the user operating user device 200. Similar to image representation 204, image representation 264 may be a projection of an image displayed on touchscreen 210 at first location 214. In some embodiments, display element 220 may also adjust the content being presented based on the action performed to control mechanism 202 (e.g., rotating about a center axis). For example, indicator 224 may be displayed representing the new setting of the functionality (e.g., the air power/flux being lowered).

Figure 3A:
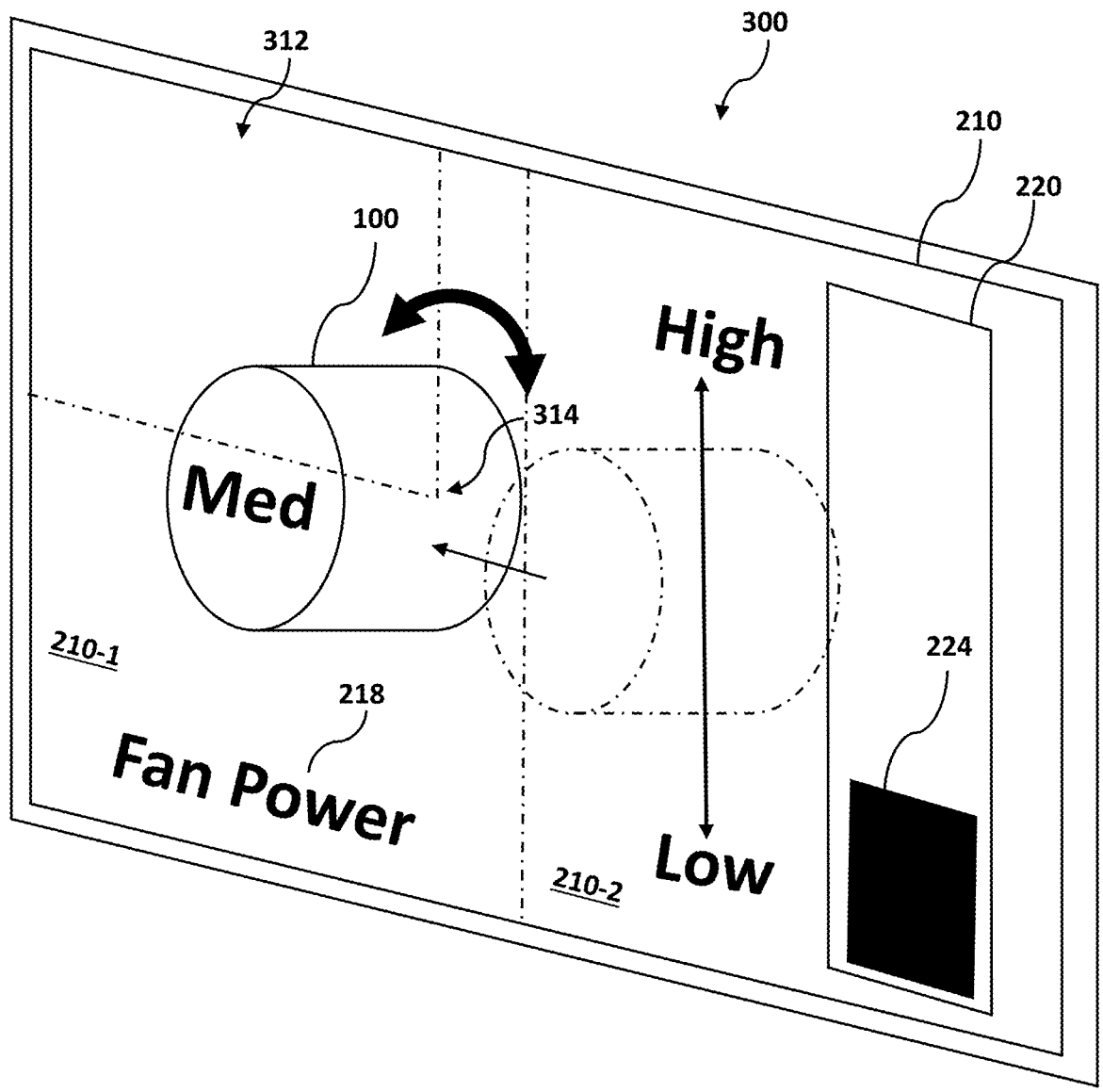
FIGS. 3A-3B illustrate schematic diagrams of content being adjusted based on a location that a control mechanism contacts a touchscreen changing, in accordance with various embodiments.
Figure 3B:
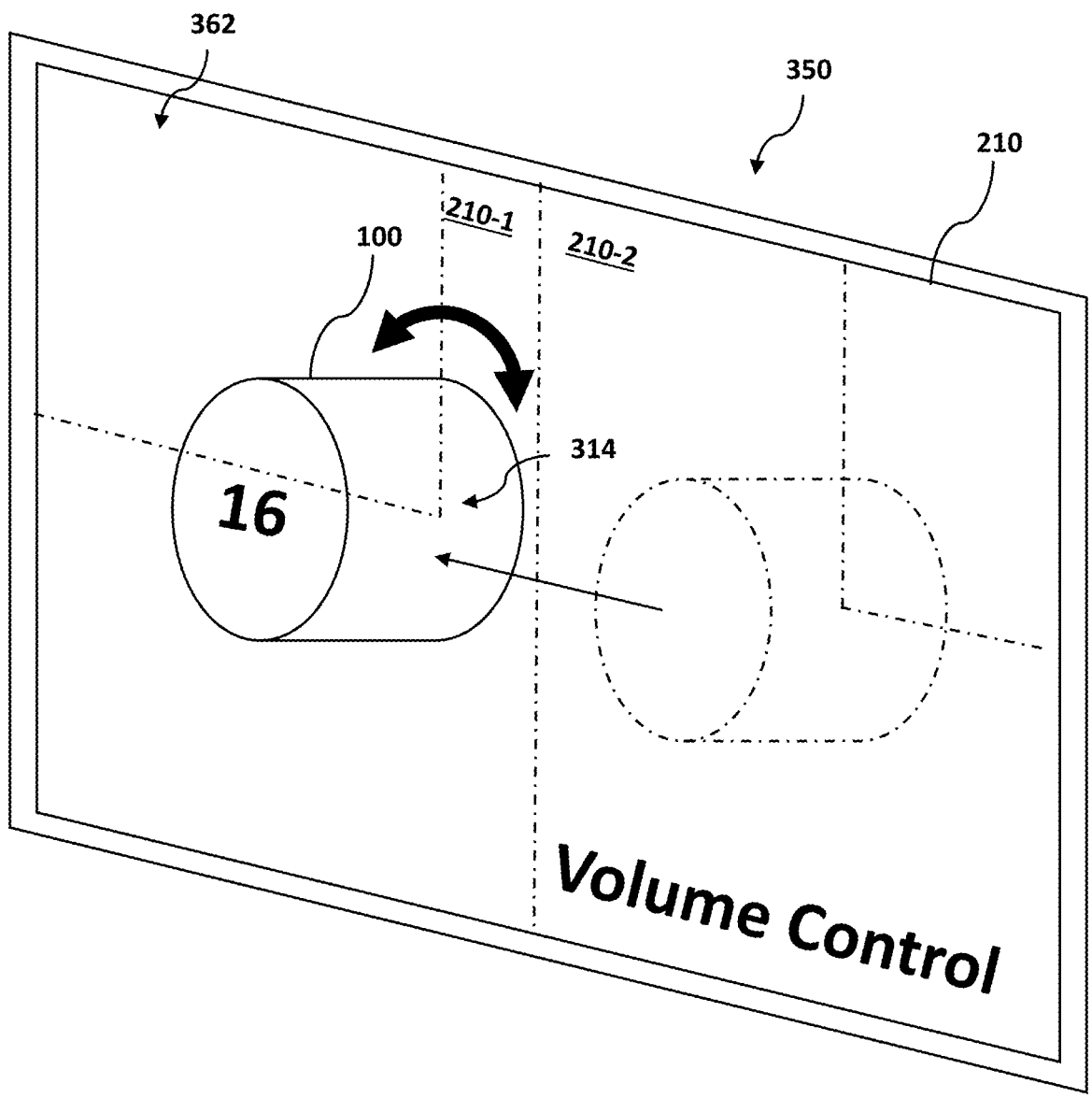

FIGS. 3A-3B illustrate schematic diagrams of content being adjusted based on a location that a control mechanism contacts a touchscreen changing, in accordance with various embodiments. As seen in FIG. 3A, user device 300 may be configured to render content 312 on touchscreen 210. Content 312 may differ from content 212 (such as that seen in FIG. 2C). For example, a first display element 218 and a second display element 220 may be positioned within different regions of touchscreen 210 for content 212 as compared to content 312. In particular, in FIG. 2C, first display element 218 may be displayed within a first region 210-1 of touchscreen 210, while second display element 220 may be displayed within a second region 210-2 of touchscreen 210. However, in FIG. 3A, first display element 218 may be displayed within second region 210-2, while second display element 220 may be displayed within first region 210-1. The different positions of the display elements, and the indicators associated therewith (if any), may be based on a location of control mechanism 100. For instance, in FIG. 2C, control mechanism 100 may contact touchscreen 210 at first location 214 (which may refer to an anchor point of the control mechanism, however alternatively the locations associated with each conductive element of the control mechanism along touchscreen 210), whereas in FIG. 3A, control mechanism 100 may contact touchscreen 210 at a location 314 (which may, similarly, refer to an anchor point of the control mechanism, however alternatively the locations associated with each conductive element of the control mechanism along touchscreen 210).

In some embodiments, the interface between control mechanism 100 and touchscreen 210 may allow control mechanism to move about touchscreen 210. For example, by applying a lateral force to (a side of) control mechanism 100, a user may move control mechanism 100 to a new location on touchscreen 210. As another example, control mechanism 100 may be detached from touchscreen 210 (e.g., such that touchscreen 210 is no longer able to detect a change in capacitance on the touchscreen) and may be placed on touchscreen 210 at a different location. Depending on the functionality being invoked, the particular motions of the control mechanism may vary. In some embodiments, a configuration of the content being rendered may vary depending on the location of control mechanism 100 on touchscreen 210. For example, moving control mechanism from first location 214 to location 314 (e.g., from second region 210-2 to first region 210-1) may cause user device 300 to adjust content 212 to be content 312. For instance, second display element 220, which was displayed in first region 210-1 when control mechanism 100 contacts touchscreen 210 at first location 214 (e.g., in second region 210-2), may be adjusted to be displayed in second region 210-2 when control mechanism 100 contacts touchscreen 210 at location 314 (e.g., in first region 210-1). In some embodiments, the settings of user device 200, 300, as well as a device/system connected thereto (e.g., a connected vehicle) may remain the same or similar to those prior to control mechanism 100 being moved. For example, in both FIGS. 2C and 3A, the air power/flux level remains constant (e.g., indicator 222 representing "Low"). Persons of ordinary skill in the art will recognize that control mechanism 100 may be moved about touchscreen 210 in any suitable manner, and the lateral movement described above is merely exemplary.

In some embodiments, movement of control mechanism 100 about touchscreen 210 can cause the functionality invoked by the user device to change. As an example, with reference to FIG. 3B, user device 350 may have control mechanism 100 contacting location 314 after having been moved there from first location 214. In some embodiments, the change in location of control mechanism 100 may cause user device 350 to change a functionality being accessed using touchscreen 210. For example, an air power/flux level of a heating/cooling system of a vehicle including user device 350 (or another user device including touchscreen 210) may be controlled via touchscreen 210 when control mechanism 100 is located within second region 210-2, while a volume level of a stereo system of the vehicle may be controlled via touchscreen 210 when control mechanism is located within first region 210-1. Furthermore, the content rendered by touchscreen 210 may be adjusted based on the change in location of control mechanism 100. Continuing the previous example, because the functionality changed from air power/flux level control to volume level control, content 362 may be rendered by touchscreen 210 based on control mechanism 100 being located within first region 210-1.

In some embodiments, a setting of a particular functionality may be adjusted based on control mechanism 100 moving to a different location along touchscreen 210. For example, based on control mechanism 100 being moved from first location 214 to location 314, an air power/flux level may be adjusted (e.g., from low to high, low to medium, medium to low, medium to high, and the like).

Figure 4A:
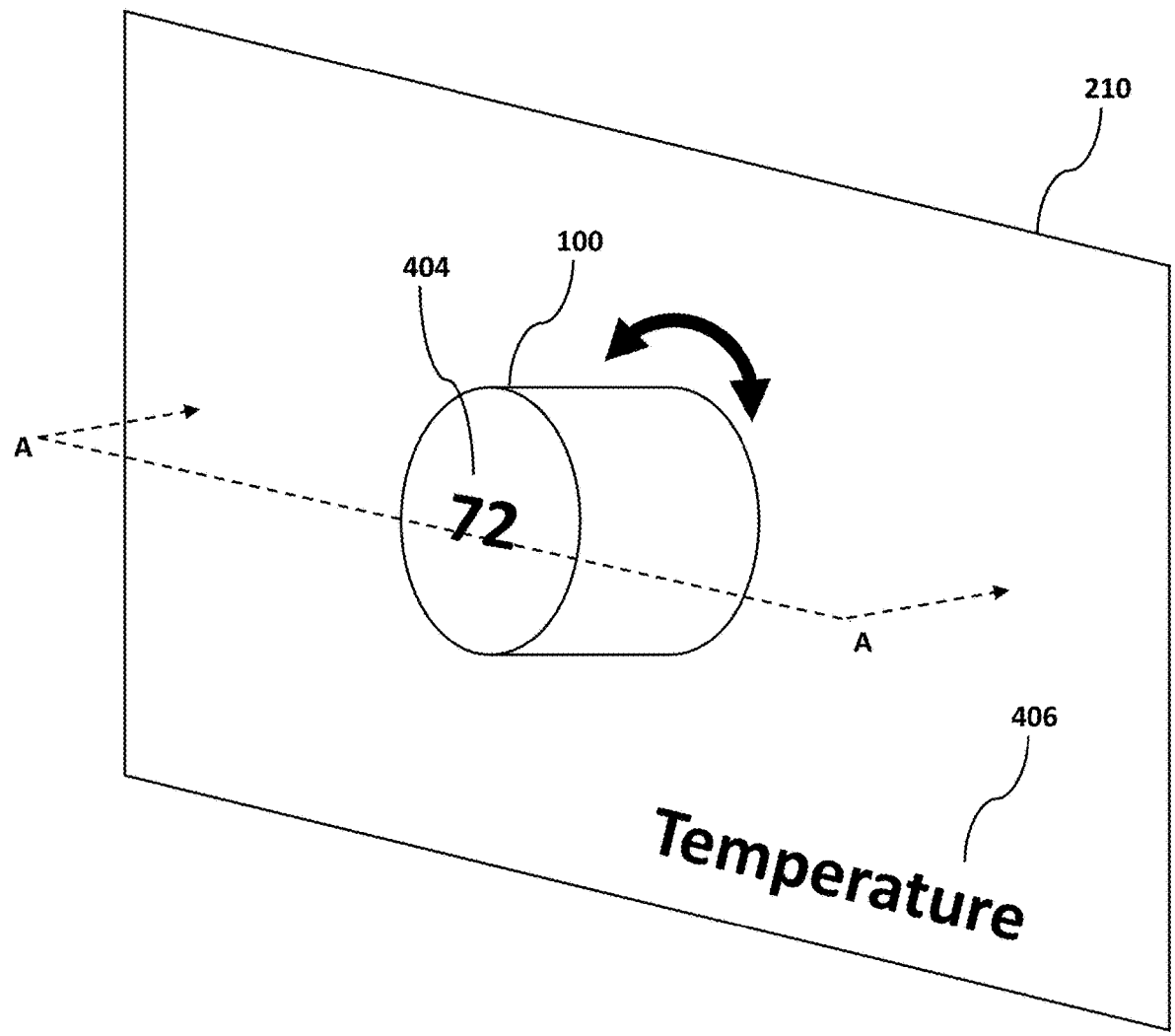
FIGS. 4A-4B illustrate schematic diagrams of a control mechanism and content rendered by a touchscreen based on the control mechanism's orientation.
Figure 4B:
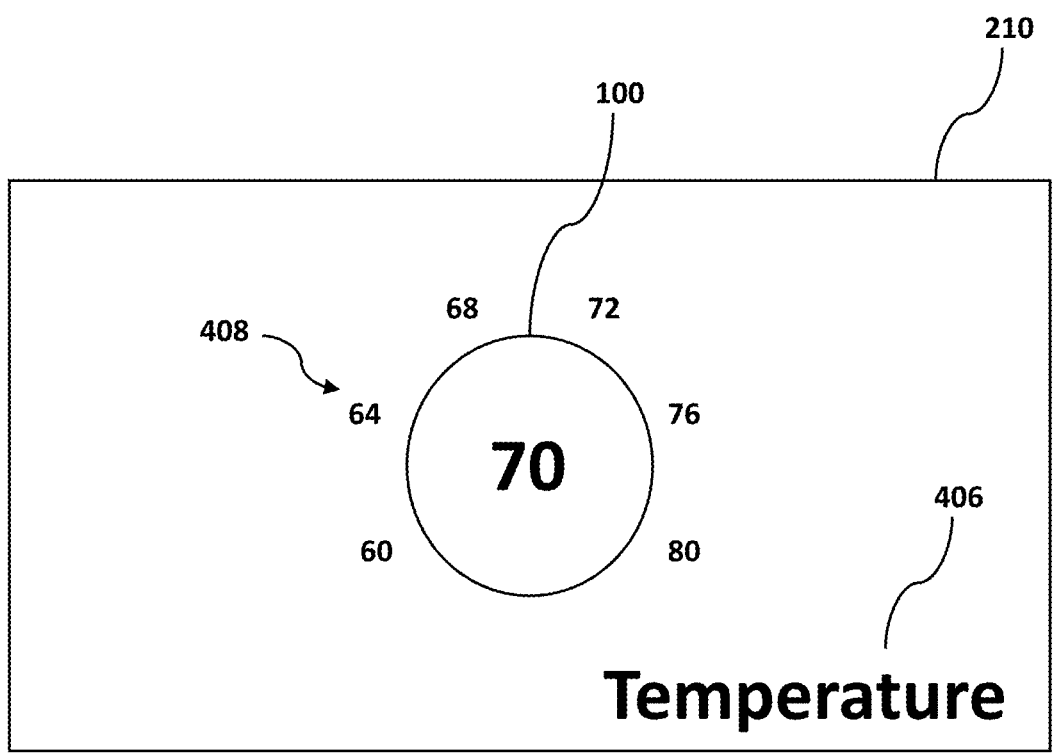

In some embodiments, adjustments to an orientation of control mechanism 100 can cause content displayed on touchscreen 210 to be changed. As an example, with respect to FIGS. 4A-4B, touchscreen 210 may display content including display element 406 and image representation 404 (which may be a projection of an image displayed on touchscreen 210 at a location where control mechanism 100 is contacting touchscreen 210). In the illustrated example, the functionality controlled via control mechanism 100 interfacing with touchscreen 210 may correspond to an air temperature level of air output by a heating/cooling system. In some embodiments, control mechanism 100 (e.g., a knob-like device) may be rotated clockwise or counterclockwise about a center (or off-center) axis. Rotating control mechanism 100 may be detected by a user device including touchscreen 210 (e.g., an HMI) based on a change in location of each conductive element of control mechanism 100. For example, for each conductive element, an angular displacement may be computed, which may serve as a basis for determining how much an air temperature should be raised or lowered.

In some embodiments, additional content may be displayed by touchscreen 210 based on control mechanism 100 being actuated (e.g., rotated). For example, as seen with respect to FIG. 4B, which is taken along line A-A of FIG. 4A, rotating control mechanism 100 may correspond to a temperature of the air output by the heating/cooling system being adjusted. Furthermore, some embodiments may include display elements 408 being displayed in response to control mechanism 100 being actuated. In the prior example, for instance, as seen with respect to FIG. 4B, display elements 408 may represent a temperature scale indicating temperatures that a user may adjust the temperature level to. In some embodiments, display elements 408 may be displayed based on detection of control mechanism's actuation. Some embodiments may have display elements 408 remaining displayed after the actuation of control mechanism 100 has ended (e.g., after a user has stopped rotating control mechanism 100 to adjust the temperature level), however some embodiments may include display elements 408 being removed from display within the rendered content after the actuation has been determined to stop.

Figure 5:
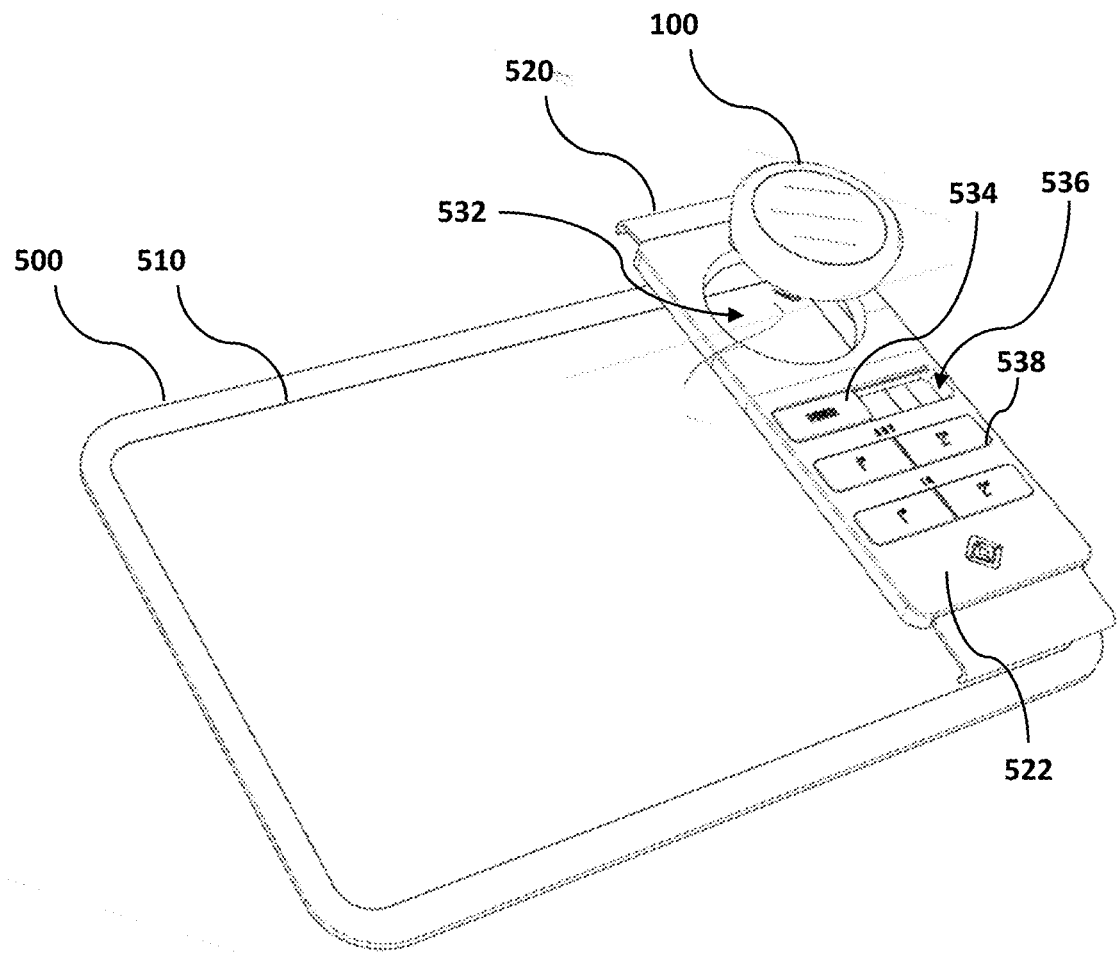
FIG. 5 illustrates a schematic diagram of an example mounting system mounted to a user device, in accordance with various embodiments.

FIG. 5 illustrates a schematic diagram of an example mounting system 520 mounted to a user device 500, in accordance with various embodiments. In some embodiments, user device 500 may be the same or similar to user device 200, and the previous description may apply. User device 500 may include a touchscreen 510. Changes in capacitance along a surface of touchscreen 510 may be detected by user device 500 as signals indicating an amount of capacitance change detected, and a coordinate location or locations of the detected capacitance change(s). The location of each detected capacitance change may indicate a particular functionality or set of functionalities that user device 500 may provide access to.

In some embodiments, mounting system 520 may fixedly couple to user device 500 such that mounting system 520 (as well as the components of mounting system 520, described below) can attach and detach from user device 500. Mounting system 520 may mount to user device 500 via a pressure-fit, an adhesive, a magnetic connection, or other coupling mechanisms, or combinations thereof. In some embodiments, a portion of mounting system 520 may contact a surface of touchscreen 510 when mounted to user device 500. For example, mounting system 520 may include a panel 522 that has a planar surface operable to contact touchscreen 510. As shown in FIG. 5, an inner surface of panel 522 may contact touchscreen 510, while an outer surface may be visible to a user operating user device 500.

In some embodiments, mounting system 520 may include one or more components, such as buttons, knobs, switches, sliders, or other types of control mechanisms. For example, mounting system 520 may include buttons 538 and/or slider 534. Alternatively or additionally, mounting system 520 may include one or more apertures or other ports that may receive and/or house a control mechanism. For example, mounting system 520 may include an aperture 532 disposed on panel 522. Control mechanism 100 may be configured to fit within aperture 532 such that control mechanism 100 may contact touchscreen 510. As another example, mounting system 520 may include aperture 536, and slider 534 may be received within aperture 536 such that slider 534 can move along an axis defined by aperture 536 to invoke a particular action to user device 500.

Mounting system 520 may include one or more conductive elements located along an inner surface of panel 522. The number and positioning of the conductive elements along mounting system 520 may be used to identify mounting system 520, the functionalities it can enable, or the types of control mechanisms (or other components) that can interface with user device 500. For example, mounting system 520 may include two conductive elements located at either end of panel 522. User device 500 may determine, based on touchscreen 510 detecting the two conductive elements, that the amount of capacitance change at the particular coordinate locations along touchscreen 510 contacted by the conductive elements indicate that a particular mounting device or type of mounting device has been coupled to user device 500. Based on this information, user device 500 may enable certain functionalities to be accessible, and may generate content for display on touchscreen 510 (which may be displayed additionally by control mechanisms 100).

Figure 6A:
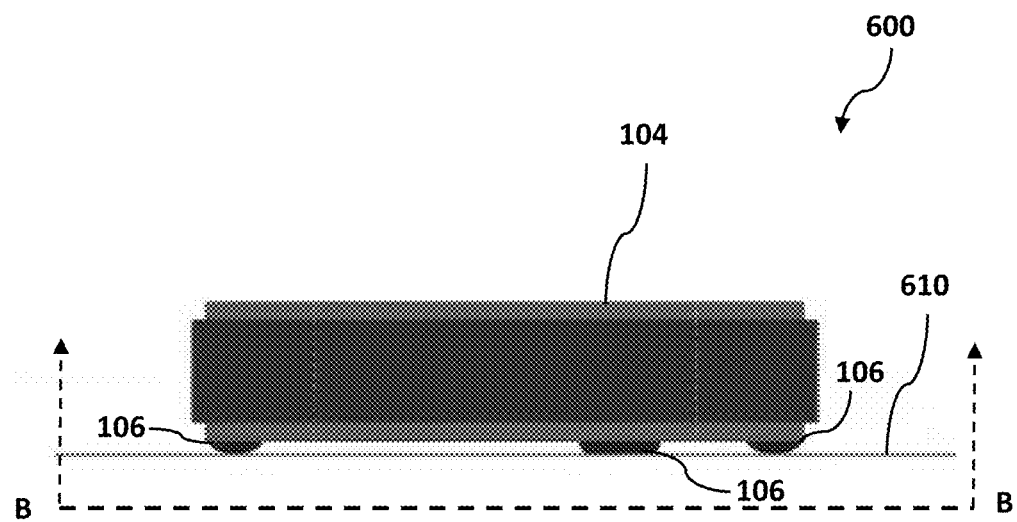
FIGS. 6A-6C illustrate schematic diagrams of a portion of a control mechanism that contacts a touchscreen, in accordance with various embodiments.
Figure 6B:
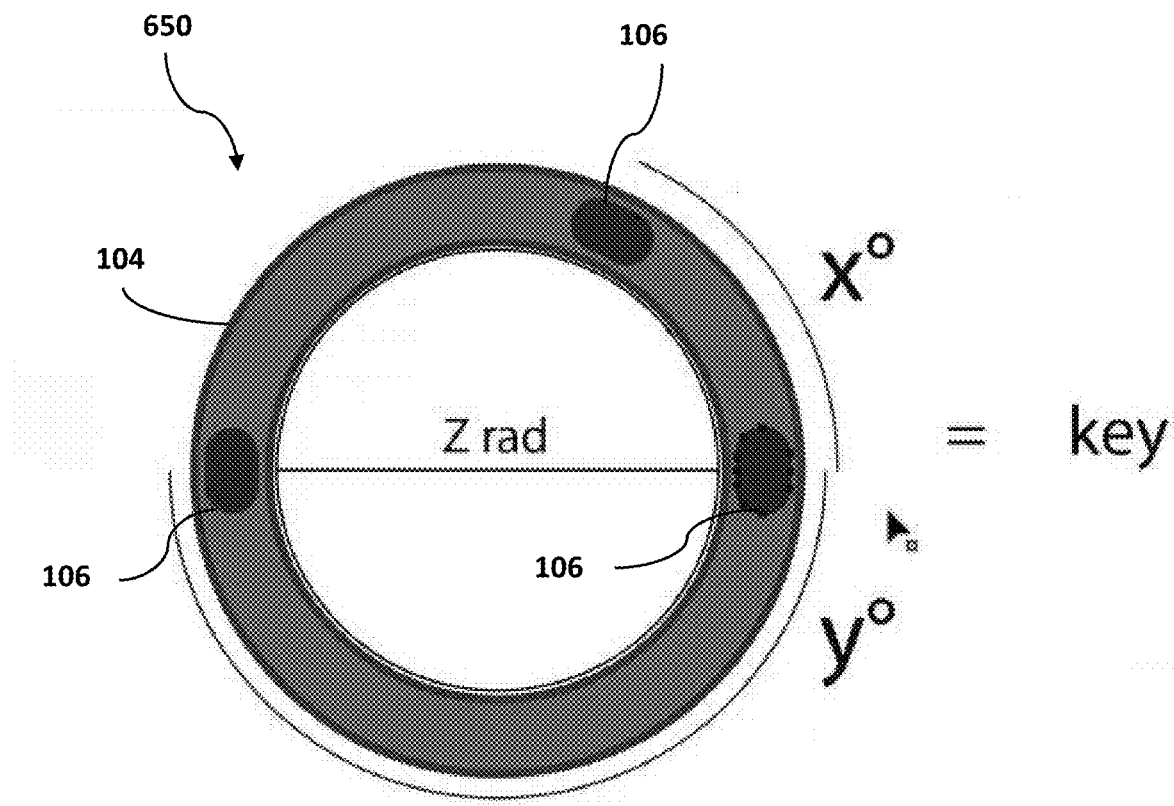
Figure 6C:
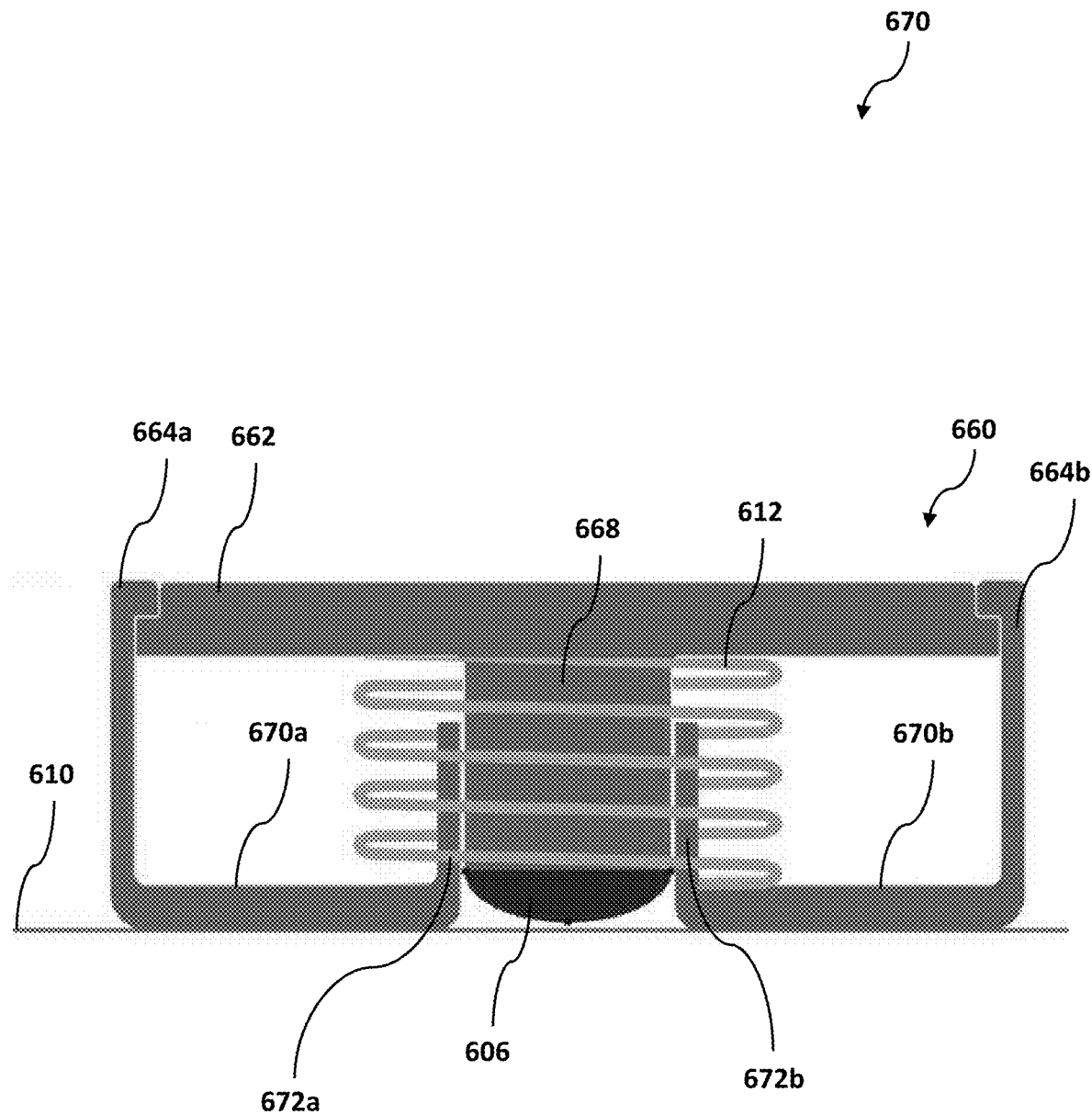

FIGS. 6A-6C illustrate schematic diagrams of a portion of a control mechanism that contacts a touchscreen, in accordance with various embodiments. As an example, FIG. 6A illustrates a side view 600 of support element 104. In some embodiments, support element 104 includes three conductive elements 106, however more or fewer conductive elements may be used. Side view 600 depicts conductive elements 106 contacting a surface 610, which may correspond to a surface of a touchscreen, such as touchscreen 210. Each conductive element 106 contacts surface 610 and the change of capacitance due to the interaction between each conductive element 106 and surface 610 may be detected by the touchscreen. Positional information, indicating a location on the touchscreen where a particular conductive element 106 contacts surface 610 may be resolved by a corresponding user device.

FIG. 6B illustrates a view 650, taken along line B-B of FIG. 6A, of support element 104 and the arrangement of conductive elements 106 about a lower surface of support element 104 (and/or control mechanism 100). In some embodiments, each conductive element 106 may have a same size and/or shape, and may be disposed at equal spacing along the lower surface of support element 104. For example, if support element 104 has a ring-like shape and includes three conductive elements 106, each conductive element may be spaced approximately 120-degrees apart. In some embodiments, the distances between conductive elements 106 (e.g., about the lower surface of support element 104) may not be equal. For example, the distance between two conductive elements 106 may be X-degrees, while the distance between one of the conductive elements 106 and another conductive element 106 may be Y-degrees. In some embodiments, the user device associated with the touchscreen that detects conductive elements 106 may be configured to resolve a distance between each of conductive elements 106. The distances between conductive elements 106 may be used to calculate, amongst other information, a radius/size of support element 104, a shape of support element 104, a type of control mechanism associated with the detected arrangement of conductive elements 106, a particular control mechanism, a user profile associated with the control mechanism, or other information, or combinations thereof. As an example, in view 650, the distance between two of conductive elements 106 being X-degrees, while the distance between another two of conductive elements 106 (which may include a same conductive element as the previously mentioned pair) may be Y-degrees. Based on the distances, the user device with which the corresponding control mechanism contacts may be configured to resolve a diameter "Z" of support element 104. Furthermore, based on the distances, the user device may determine a key or profile associated with the corresponding control mechanism, which may be used to adjust the content depicted on the touchscreen, or may indicate functionalities of the user device that may be accessed.

FIG. 6C illustrates a side view 670 of another type of control mechanism 660. For example, control mechanism 660 may be a "button"-like device, such as button 538 of FIG. 5. In some embodiments, control mechanism 660 may include additional elements, such as a projection element or other element (e.g., an element designed to be contacted by a human digit). Control mechanism 660 may include a ceiling element 662, sidewalls 664a, 664b, floor elements 670a, 670b, inner-walls 672a, 672b, extender element 668, and conductive element 606. In some embodiments, ceiling element 662 may be formed of a similar material as that of projection element 102. Sidewalls 664a, 664b may be used to support ceiling element 662 such that ceiling element 662 can be depressed as a result of a force being applied to its upper surface (e.g., via a human digit) without control mechanism 660 losing its shape/structural stability. Floor elements 670a, 670b may contact surface 610, and may be composed of a material that will not damage surface 610 (e.g., rubber, plastics, foam, etc.). Inner-walls 672a, 672b may define a cavity whereby extender element 668 may be disposed. In some embodiments, inner-walls 672a, 672b extend up to ceiling element 662. Extender element 668 may be coupled to an inner surface of ceiling element 662 at a first end, while at a second end, a conductive element 606 may be included. Conductive element 606 may be configured to contact surface 610 when ceiling element 662 is pressed and removed from contact with surface 610 when not pressed. In some cases, conductive element 606 may remain in contact with surface 610 until another action is performed (e.g., until ceiling element 662 is pressed again). When conductive element 606 contacts surface 610, the change in capacitance of the touchscreen may be detected by a corresponding user device. Similarly, when conductive element 606 is removed from contact with surface 610, the capacitance may again change (e.g., returning to pre-contact capacitance). Detection of such a capacitance change can cause a particular functionality to be invoked. For example, in response to detecting the capacitance change, a corresponding user device may generate a control signal to cause a particular functionality to be invoked (e.g., music player turning on, heating/cooling system turning on, etc.). Control mechanism 660 may further include a restoring element 612 configured to provide resistance to ceiling element 662 to cause conductive element 606 to be removed from contact with surface 610 (e.g., such as a spring).

Figure 7A:
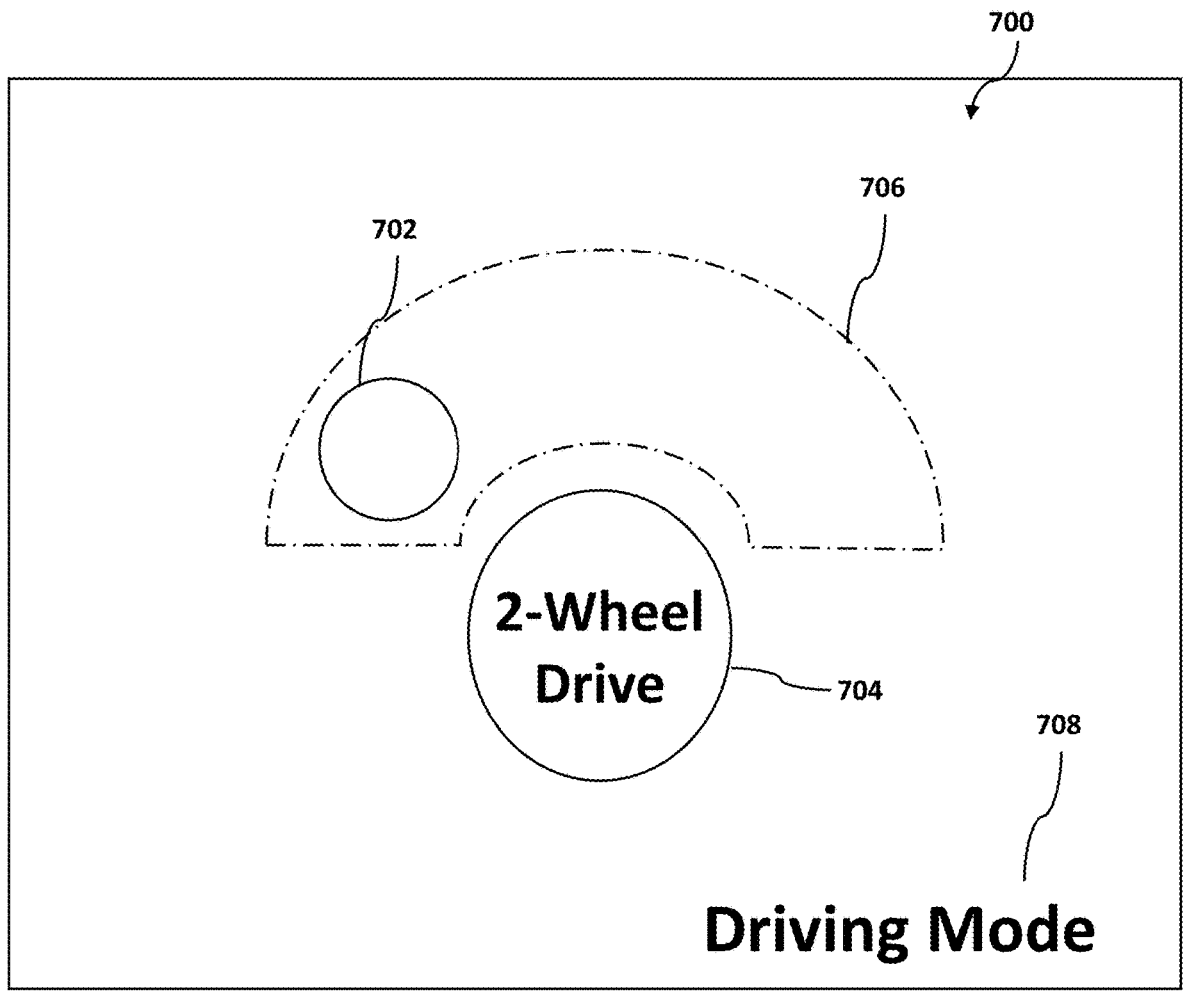
FIGS. 7A-7B illustrate schematic diagrams of a user interface rendered on a touchscreen based on a movement of a control mechanism about the touchscreen, in accordance with various embodiments.
Figure 7B:
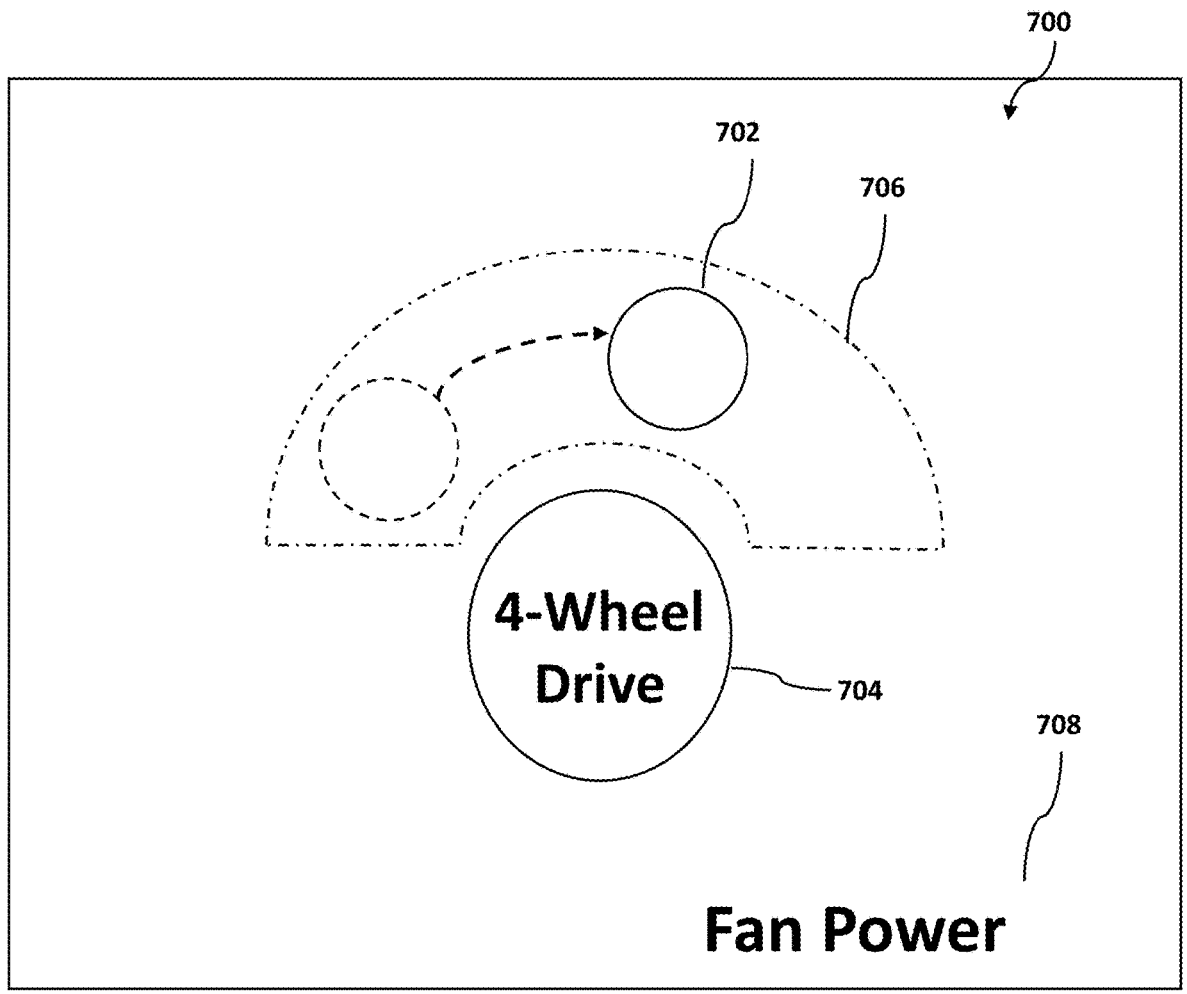

FIGS. 7A-7B illustrate schematic diagrams of a user interface rendered on a touchscreen based on a movement of a control mechanism about the touchscreen, in accordance with various embodiments. As an example, as shown in FIG. 7A, a user interface rendered on a touchscreen (e.g., touchscreen 210) may include content 700. In some embodiments, content 700 may include a first indicator 704 and a second indicator 708. Indicators 704, 708 may display information related to a particular functionality being invoked by a corresponding user device (e.g., a connected vehicle). For example, second indicator 708 may display the particular functionality being invoked, and first indicator 704 may display an aspect of the invoked functionality (e.g., a particular setting, such as a drive mode). In some embodiments, content 700 may also include a region specifying where a control mechanism 702 can be moved about the touchscreen. Control mechanism 702 may be the same or similar to control mechanism 100, and the previous description may apply. Alternatively, control mechanism 702 may differ from control mechanism 100 (e.g., may not include a projection element).

Control mechanism 702 may be capable of moving about a surface of the touchscreen. For instance, a user may cause control mechanism 702 to be moved within a region 706. Movement of control mechanism 702 about region 706 may cause a functionality or aspect thereof to change. For example, as seen with respect to FIG. 7B, control mechanism 702 be moved to a different location along the touchscreen. In some embodiments, moving control mechanism 702 to the different location can cause a functionality of the user device, or an aspect of an invoked functionality, to change. For instance, moving control mechanism 702 within region 706 may cause a driving mode to change from a first mode (e.g., "2-Wheel Drive") to a second mode (e.g., "4-Wheel Drive"). In some embodiments, moving control mechanism 702 may cause content 700 to be adjusted. For example, movement of control mechanism 702 within region 706 can cause content 700 to display the different content within first indicator 704 (e.g., displaying the words "4-Wheel Drive" in FIG. 7B and displaying words "2-Wheel Drive" in FIG. 7A).

FIGS. 8A-8G illustrate schematic diagrams of additional example control mechanisms, in accordance with various embodiments. In some embodiments, the control mechanism may be a joystick-type control mechanism, a button, a knob, a slider, or another type of control mechanism, or a combination thereof. As an example, with reference to FIG. 8A, control mechanism 800 may include a first portion 802 and a second portion 804. In some embodiments, control mechanism 800 may include additional elements. First portion 802 may be capable of being rotated about second portion 804. First portion 802 may also be pressed (or pulled) into (or out of) second portion 804. This action may cause a conductive element of control mechanism 800 to contact a surface of a touchscreen. In some embodiments, control mechanism 800 may include one or more elements that are formed of a material similar to or the same as that of projection element 102. For instance, first portion 802 may be formed of a fiber-optic glass, or another transparent or semi-transparent material, such that images rendered by the touchscreen can be projected to first portion 802.

In some embodiments, a user may apply a force to control mechanism 800 to cause control mechanism 800 to move. As a result of the force being applied, conductive elements of control mechanism 800 may also move. A touchscreen may detect that the conductive elements have moved and, based on the movement, may cause an action to occur (e.g., cause a device to perform an operation) and/or cause content rendered by the touchscreen to be adjusted. In some embodiments, the motion of the conductive elements may be 1-dimensional or 2-dimensional.

Figure 8A:
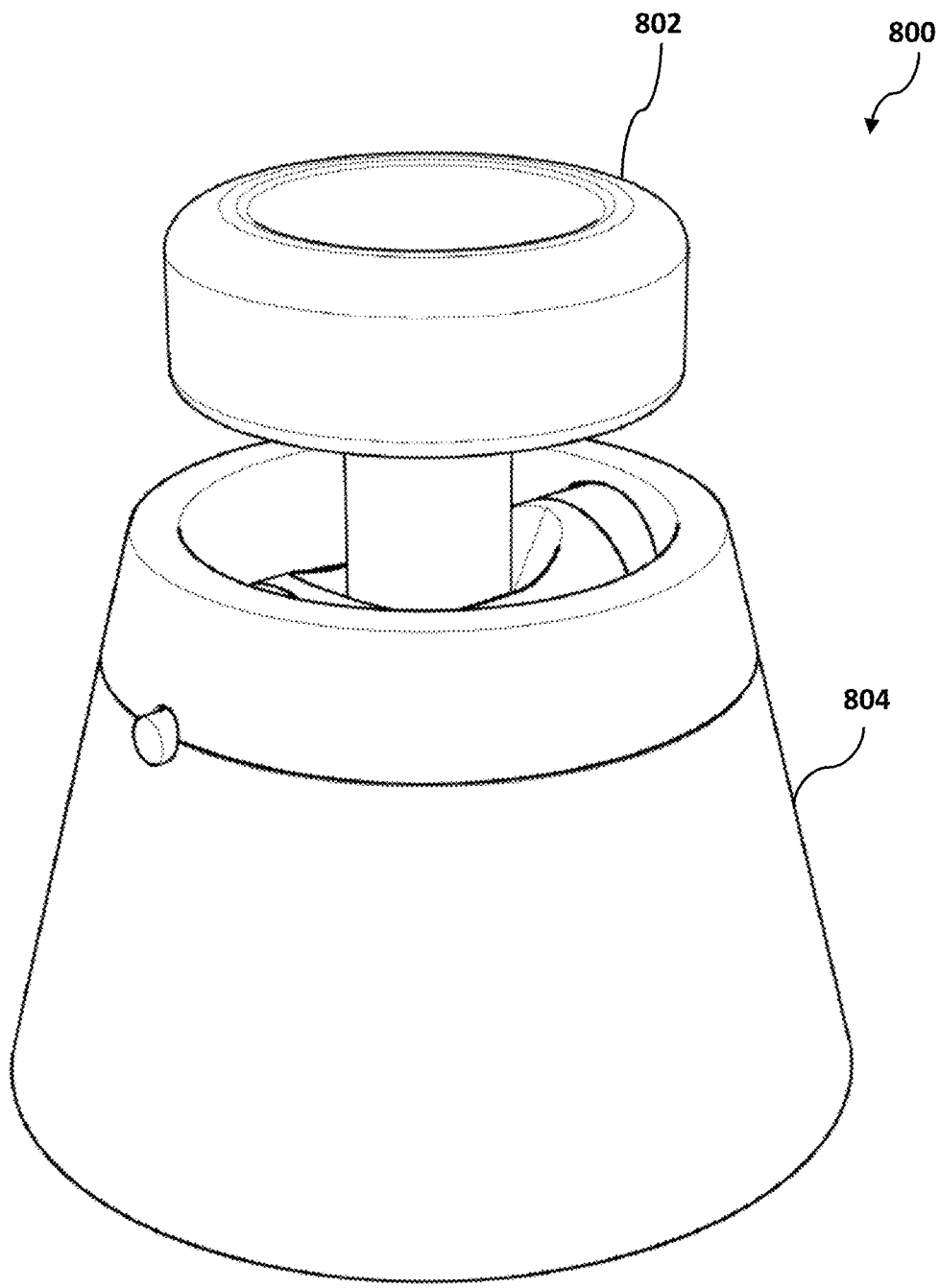
FIGS. 8A-8G illustrate schematic diagrams of additional example control mechanism, in accordance with various embodiments.
Figure 8B:
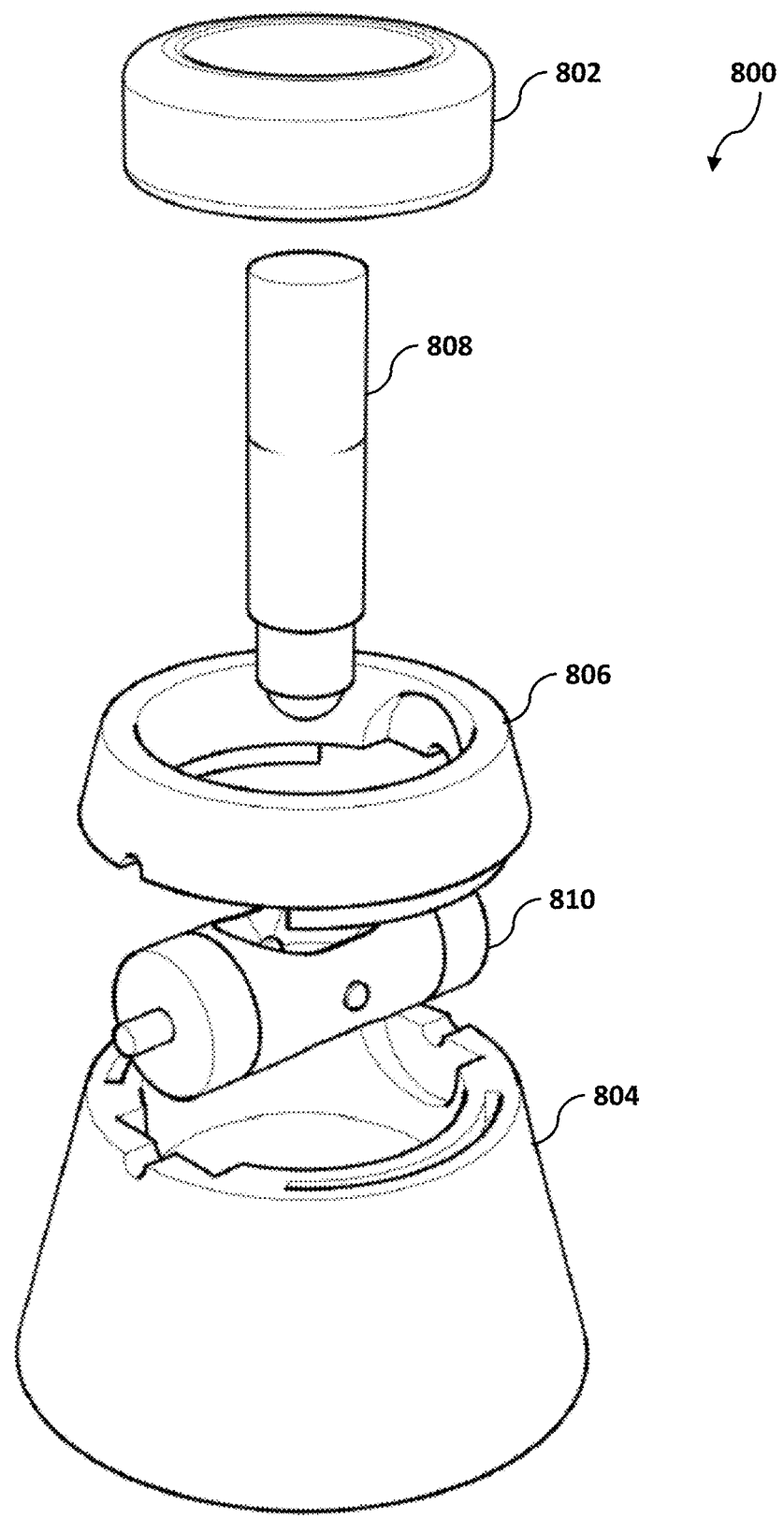

An exploded view of control mechanism 800 is illustrated by FIG. 8B. As seen in FIG. 8B, first portion 802 may be coupled to a first arm 808, which bisects a second arm 810. In some embodiments, first portion 802 may be rotated clockwise or counter-clockwise about first arm 808, while first portion 802 may be tilted towards a third portion 806. Third portion 806 represents an upper portion of second portion 804 with which second arm 810 resides. Third portion 806 may rotate about second portion 804.

Figure 8C:
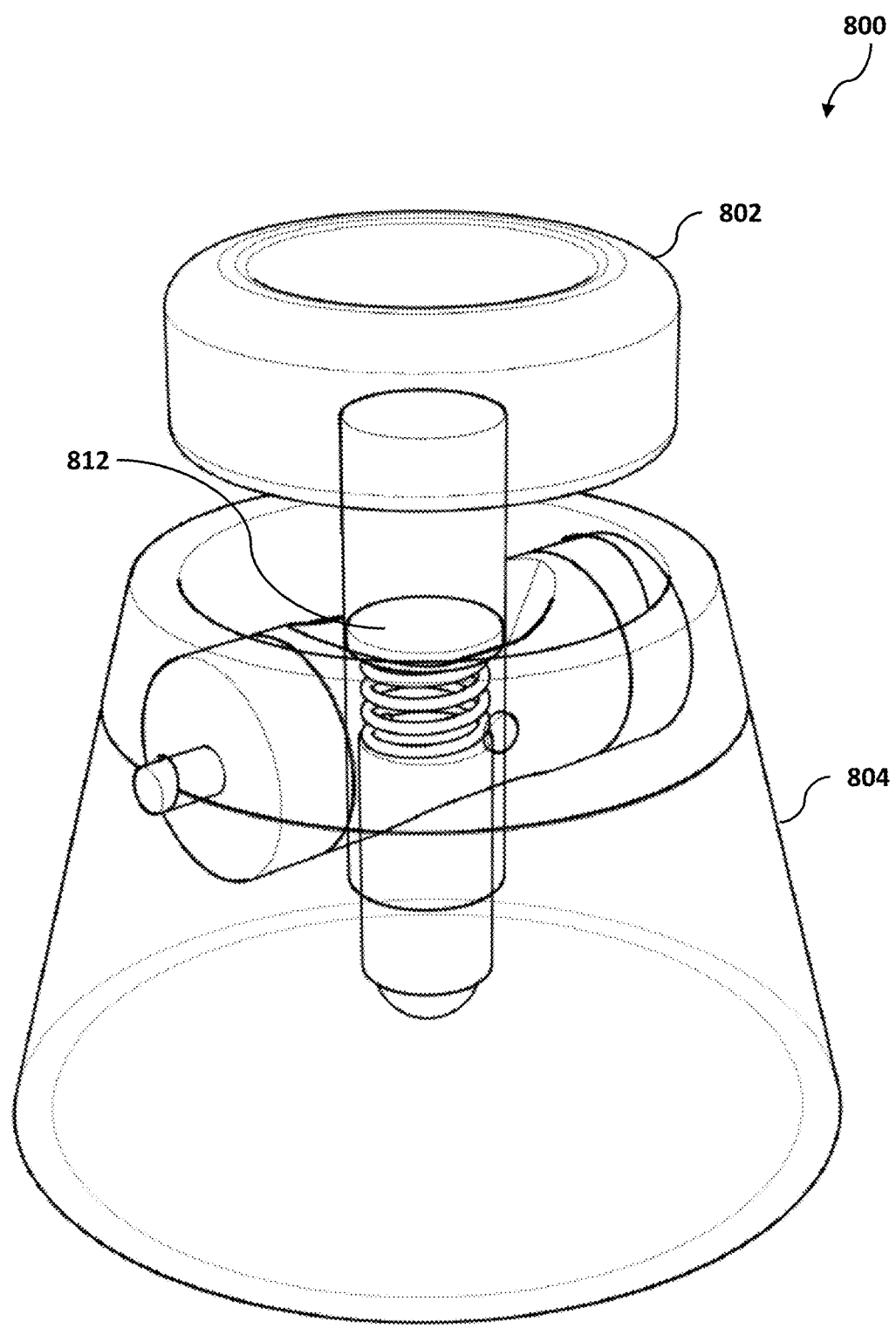
Figure 8D:
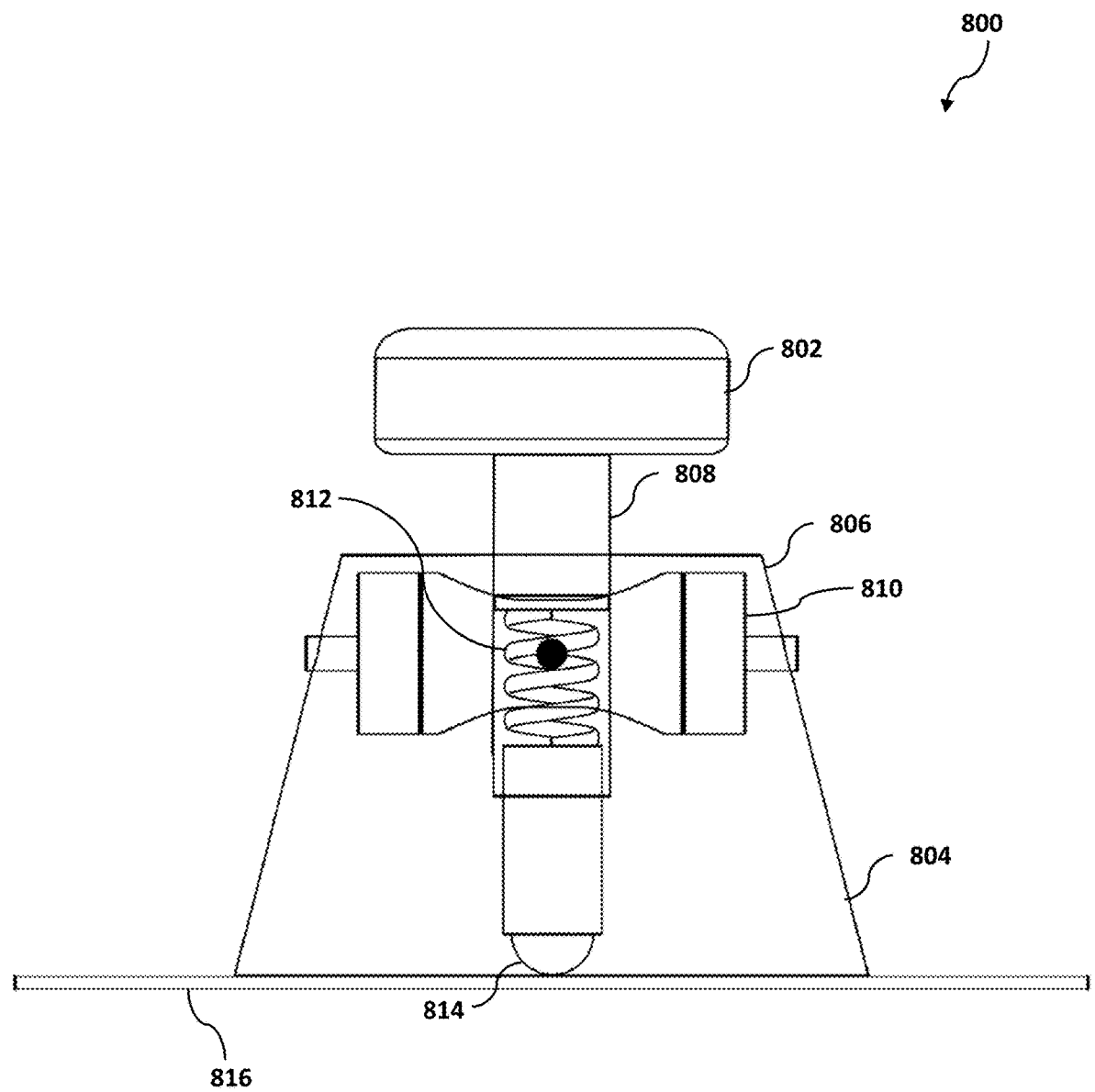

In some embodiments, first portion 802 may be pressed in a direction of second portion 804. As a result, a conductive element may contact a surface. For example, as seen in FIGS. 8C and 8D, a spring 812 may be included in control mechanism 800. In some embodiments, spring 812 may be integrated within first arm 808. Alternatively, spring 812 may be disposed within a cavity of first portion 802 or on an exterior surface of first arm 808. When first portion 802 is pressed (e.g., in a direction of surface 816), this may cause a conductive element 814 to contact surface 816. By contacting surface 816, conductive element 814 may cause a capacitance of a touchscreen to change, which can be detected by the touchscreen. The user device including the touchscreen may determine an action to be performed based on the detected capacitance change, and send an instruction to one or more components to cause the action to be effectuated.

Figure 8E:
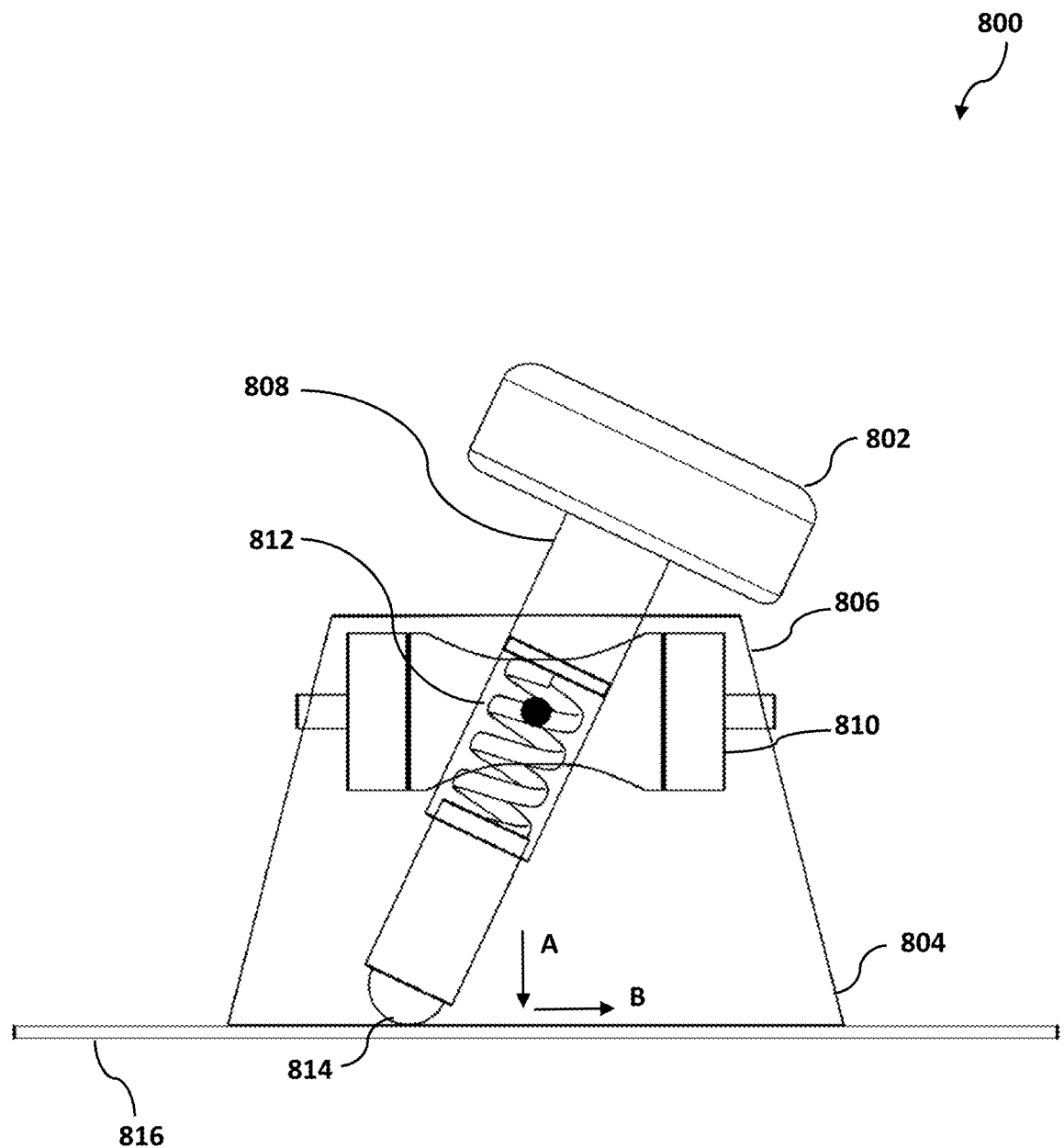

In some embodiments, a user may be configured to provide more complex interactions with a user device via control mechanism 800. For example, as seen in FIG. 8E, control mechanism 800 may be capable of providing two-dimensional input. Instead of providing an input vertically, as in the case of FIG. 8D, control mechanism 800 may also be provided an input having a component in a direction towards surface 816, as indicating by arrow A, and another component in a horizontal direction, along surface 816, as indicated by arrow B. In some embodiments, this may allow control mechanism 800 to be used as a joystick, which may be used for gaming interactions with a user device, control functionalities of a connected vehicle, or other types of interactions.

Figure 8F:
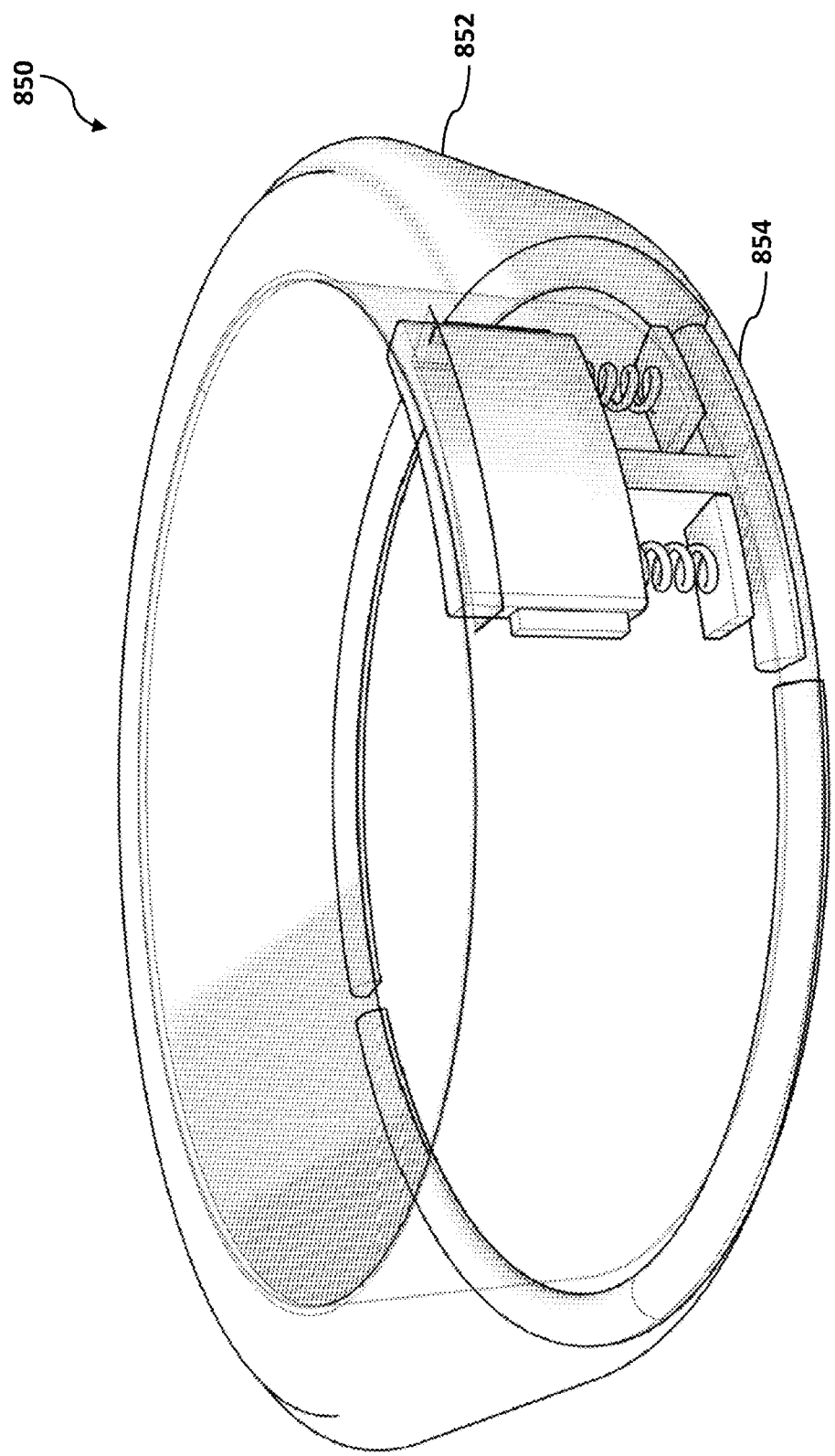
Figure 8G:
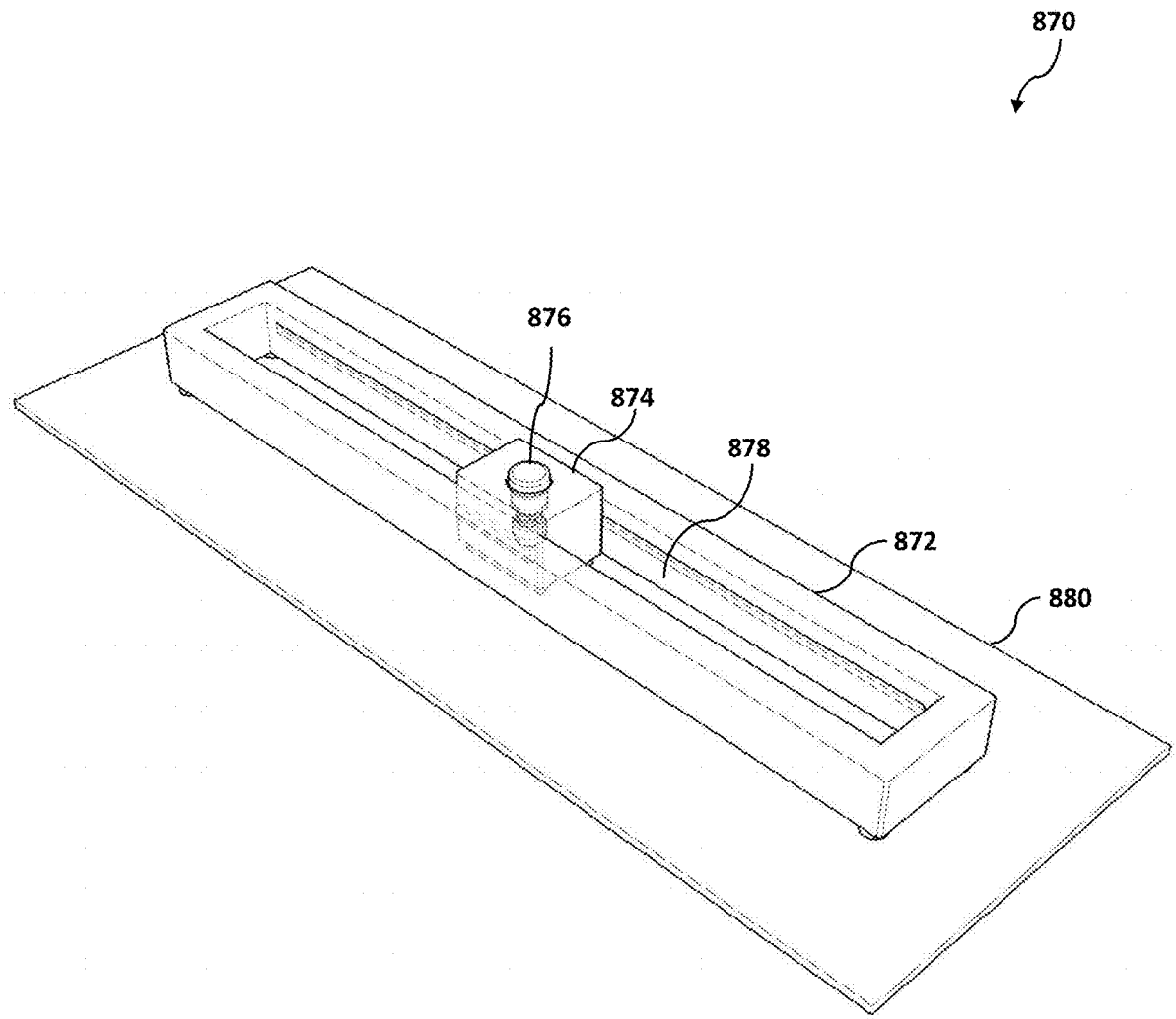

In some embodiments, the control mechanism may take a different form. For example, with reference to FIG. 8F, control mechanism 850 may include a ring 852 having conductive element 854. Although only one conductive element is depicted in FIG. 8F, additional conductive elements may be included. In some embodiments, one or more portions of ring 852 may be capable of being pushed toward a surface with which control mechanism 850 resides to cause conductive element 854 contact a touchscreen's surface.

In some embodiments, the control mechanism may include a slider. For example, as seen with reference to FIG. 8G, control mechanism 870 may include a base portion 872 having a track 878 (e.g., a channel) with which a sliding element 874 is disposed. Control mechanism 870 may reside on a surface 880, such as a surface of a touchscreen of a user device integrated within a connected vehicle. In some embodiments, sliding element 874 may be moved along track 878. Sliding element 874 may include conductive elements configured to contact surface 880. When sliding element 874 moves along track 878, the conductive elements may contact different portions of surface 880, which may cause the connected user device to perform different actions. In some embodiments, sliding element 874 may include a button 876, which may be pressed to cause an additional conductive element to contact surface 880. As a result of detecting the additional element, corresponding to button 876, contacting surface 880, the connected user device may perform a specific action (e.g., selecting a displayed feature). In some embodiments, one or more components of control mechanism 870 may be formed of a transparent or semi-transparent material such that content rendered on surface 880 (e.g., a surface that is beneath control mechanism 870) is visible.

Figure 9:
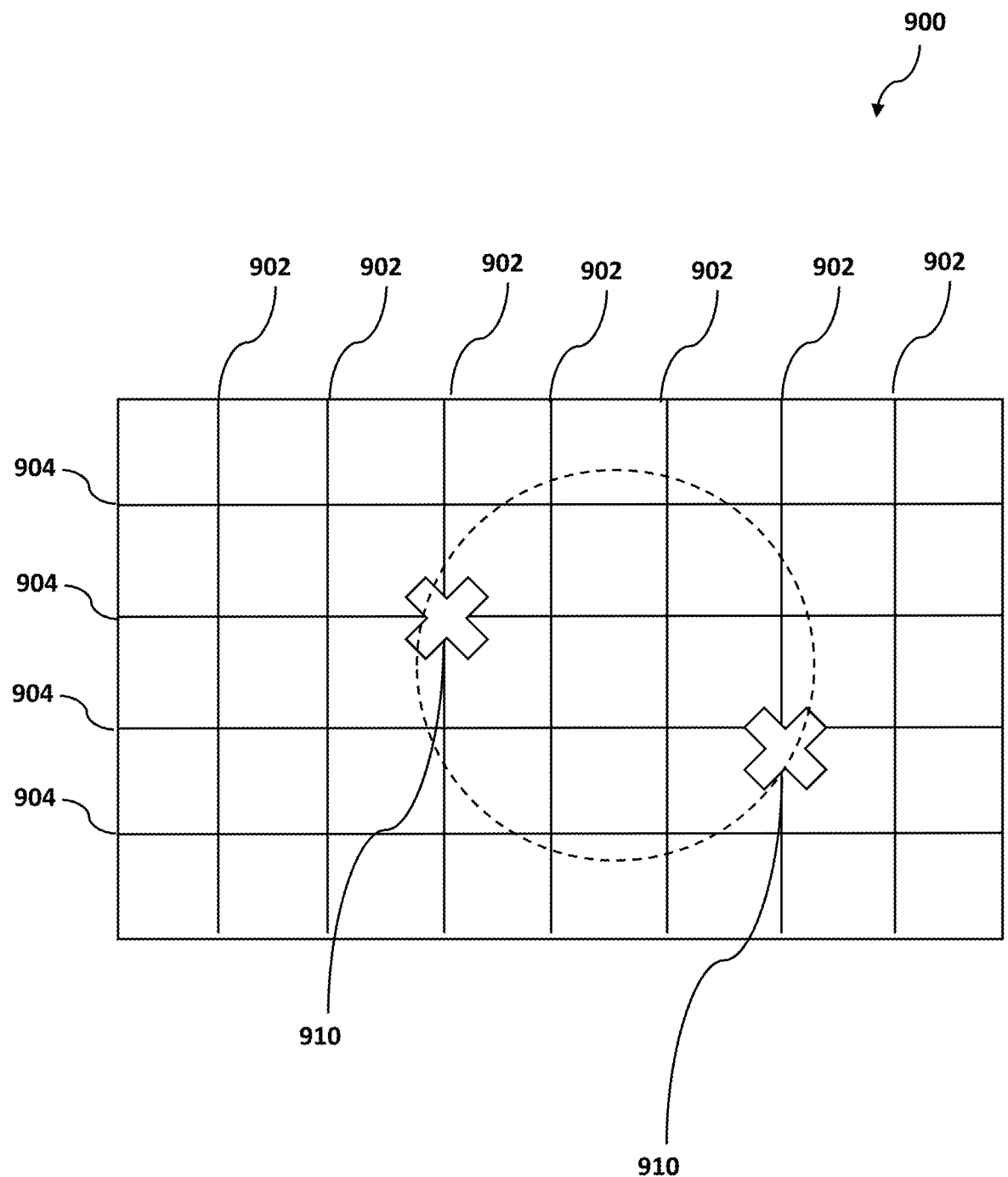
FIG. 9 illustrates a schematic diagram of an example touchscreen, in accordance with various embodiments.

FIG. 9 illustrates a schematic diagram of an example touchscreen 900, in accordance with various embodiments. Touchscreen 900, as well as the other touchscreens described herein, may employ one or more touch sensing techniques. For example, touchscreen 900 may be a resistive touchscreen, a capacitive touchscreen, infrared touchscreens, optical touchscreens, or other touchscreen types. For illustrative purposes, touchscreen 900 is described as a capacitive touchscreen, however persons of ordinary skill in the art will recognize other techniques for touchscreen sensing may be used. Further still, some embodiments include touchscreen 900 being configured to detect hovering (e.g., whereby no physical contact occurs).

In some embodiments, touchscreen 900 may include a glass surface disposed on top of a grid of conductive traces 902 along a first axis and conductive traces 904 along a second axis. Together, traces 902 and 904 form a grid. In some embodiments, touchscreen 900 may include a transparent electrode layer disposed beneath, or integrated within, a glass substrate layer. When a conductive object, such as a human digit, a stylus, a control mechanism (e.g., control mechanism 100) contacts a surface of touchscreen 900, a change in capacitance occurs at a location of the point of contact. For example, at contact point 910, a conductive element contacts touchscreen 900. In some embodiments, a user device associated with touchscreen 900 may include one or more sensors capable of detecting the change in capacitance along the various lines of traces 902, 904, and can resolve the location of contact to be contact point 910. For instance, based on the electric current generated as a result of the capacitance change at contact point 910, the corresponding user device can determine an X-Y coordinate along touchscreen 900 where the contact is being made.

Figure 10:
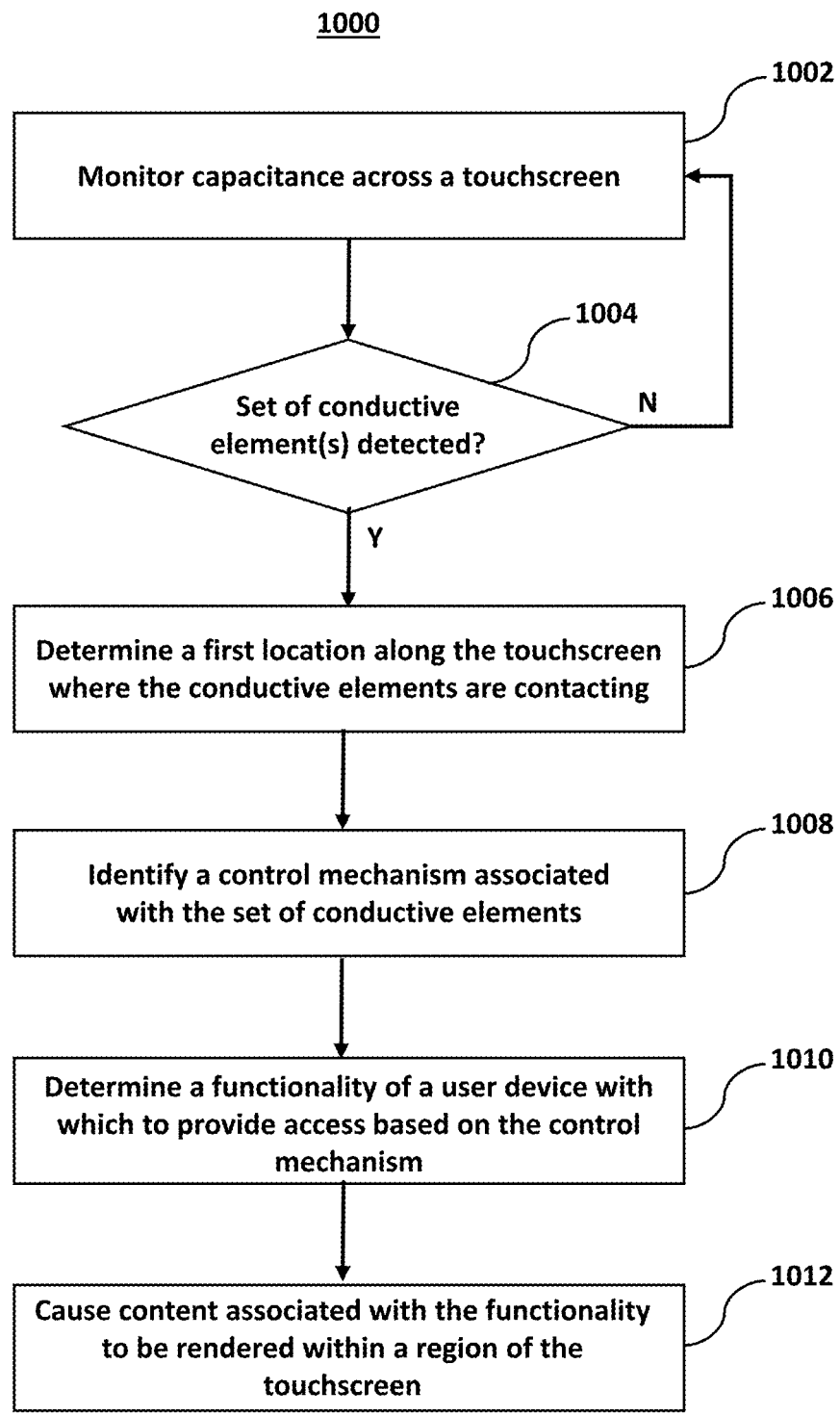
FIG. 10 is a flowchart illustrating steps of a method for rendering content via a touchscreen based on a detected control mechanism, in accordance with various embodiments.

FIG. 10 is a flowchart illustrating steps of a process 1000 for controlling a functionality of a user device, in accordance with various embodiments. Process 1000 may begin at step 1002. At step 1002, a capacitance across a touchscreen may be monitored. The touchscreen may be part of a computing device, such as a computing device of a connected vehicle system. Changes in capacitance may indicate user inputs, so monitoring the capacitance can allow the computing device to detect when a user is attempting to interface with the computing device. Process 1000 may proceed to step 1004. At step 1004, a determination may be made as to whether a set of conductive elements has been detected. In some embodiments, the touchscreen may sample a capacitance across the touchscreen a predefined frequency. When a change in capacitance is detected, that may indicate that a set of conductive elements has contacted the touchscreen. If, at step 1004, it is determined that no conductive elements have been detected as contacting the touchscreen, process 1000 may return to step 1002. However, if at step 1004 it is determined that one or more conductive elements have contacted the touchscreen, process 1000 may proceed to step 1006.

At step 1006, a first location along the touchscreen, where the conductive elements contact the touchscreen, may be determined. The computing device may approximate a location of each (if multiple) contact point on the touchscreen. In some embodiments, characteristics of the conductive elements may also be determined based on their approximate locations. For example, a size, shape, quantity, etc., may be resolved based on the touchscreen's sensitivity. If multiple control mechanisms are contacting touchscreen 210, the contact points of each control mechanism may also be determined. At step 1008, a control mechanism associated with the set of conductive elements may be identified. In some embodiments, different control mechanisms may include different quantities, configurations, arrangements, or other different types of conductive elements. For example, some control mechanisms may include two conductive elements, while another may include ten conductive elements. As another example, some control mechanisms may include a set of conductive elements forming a circle, while other control mechanisms may include a set of conductive elements that move along a linear track.

At step 1010, a functionality of a user device with which to provide access via the touchscreen may be determined. In some embodiments, the functionality may be based on the identified control mechanism. For example, one control mechanism may be used for accessing one functionality of the computing device, while another control mechanism may be used for accessing another functionality of the computing device. As another example, multiple control mechanisms, such as a first control mechanism and a second control mechanism, may be placed on the touchscreen. A first function of the computer program that the first control mechanism is configured to facilitate execution of may be identified, and a second function of the computer program that the second control mechanism is configured to facilitate execution of may also be identified. At step 1012, content associated with the determined functionality may be rendered within a region of the touchscreen. In some embodiments, the region of the touchscreen where the content is rendered corresponds to a region of the touchscreen external to a region covered by the control mechanism when contacting the touchscreen. For example, if the control mechanism is placed on one side of the touchscreen, the content may be rendered on another side of the touchscreen. In some embodiments, the content may be rendered on the region on top of which the control mechanism resides. For example, the control mechanism may include a projection element configured to project the content rendered on the touchscreen to an exterior surface of the projection element. This may allow an operator to view the content whilst using the control mechanism.

Particular embodiments may repeat one or more steps of the method of FIG. 10, where appropriate. Although this disclosure describes and illustrates particular steps of process 1000 of FIG. 10 as occurring in a particular order, this disclosure contemplates any suitable steps of process 1000 of FIG. 10 occurring in any suitable order. Moreover, although this disclosure describes and illustrates an example method for controlling a functionality of a user device including the particular steps of process 1000 of FIG. 10, this disclosure contemplates any suitable method for controlling a functionality of a user device including any suitable steps, which may include all, some, or none of the steps of process 1000 of FIG. 10, where appropriate. Furthermore, although this disclosure describes and illustrates particular components, devices, or systems carrying out particular steps of method of FIG. 10, this disclosure contemplates any suitable combination of any suitable components, devices, or systems carrying out any suitable steps of method of FIG. 10.

Figure 11:
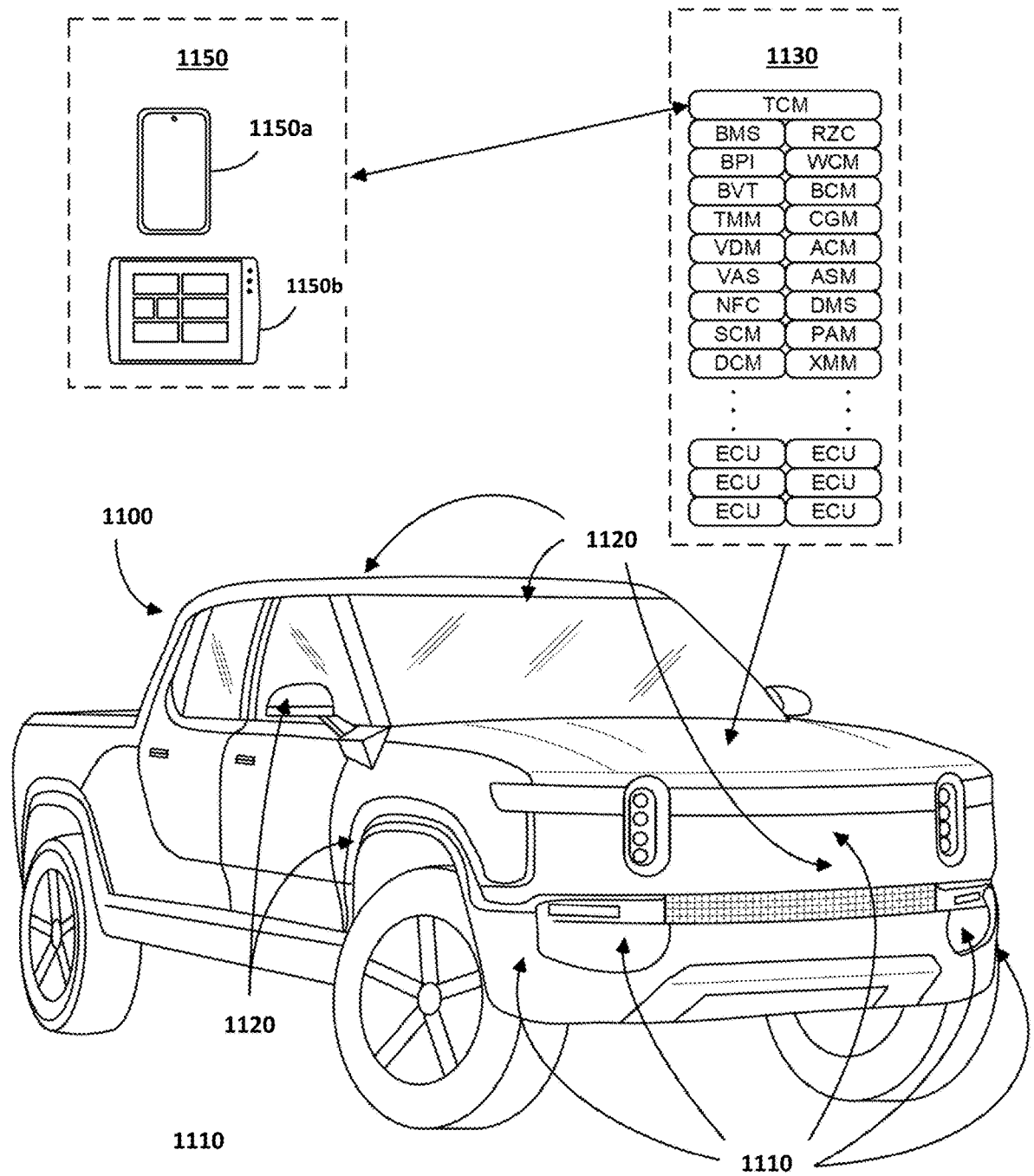
FIG. 11 illustrates an example vehicle, in accordance with various embodiments.

FIG. 11 illustrates an example vehicle 1100, in accordance with various embodiments. Vehicle 1100 may include multiple sensors 1110, multiple cameras 1120, and a control system 1130. In some embodiments, vehicle 1100 may be able to pair with a computing device 1150 (e.g., smartphone 1150a, tablet computing device 1150b, or a smart vehicle accessory). As an example and not by way of limitation, a sensor 1110 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 1120 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 1100 may include various controllable components (e.g., doors, seats, windows, lights, HVAC, entertainment system, security system), instrument and information displays and/or interactive interfaces, functionality to pair a computing device 1150 with the vehicle (which may enable control of certain vehicle functions using the computing device 1150), and functionality to pair accessories with the vehicle, which may then be controllable through an interactive interface in the vehicle or through a paired computing device 1150.

Control system 1130 may enables control of various systems on-board the vehicle. As shown in FIG. 11, control system 1130 may comprise one or more electronic control units (ECUs), each of which are dedicated to a specific set of functions. Each ECU may be a computer system (as described further in FIGS. 13-14), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 1150, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Winch Control Module (WCM) ECU. The WCM ECU may provide functions to operate a winch mounted on or incorporated into the vehicle. The WCM ECU may control reeling the winch cable in and out, measure the force of a payload on the winch assembly, control a winch remote clutch, and provide safety features related to the winch.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 1130.

Vehicle 1100 may include one or more additional ECUs, such as, by way of example and not limitation: a Vehicle Access System (VAS) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, and/or a Driver Monitoring System (DMS) ECU. If vehicle 1100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 12:
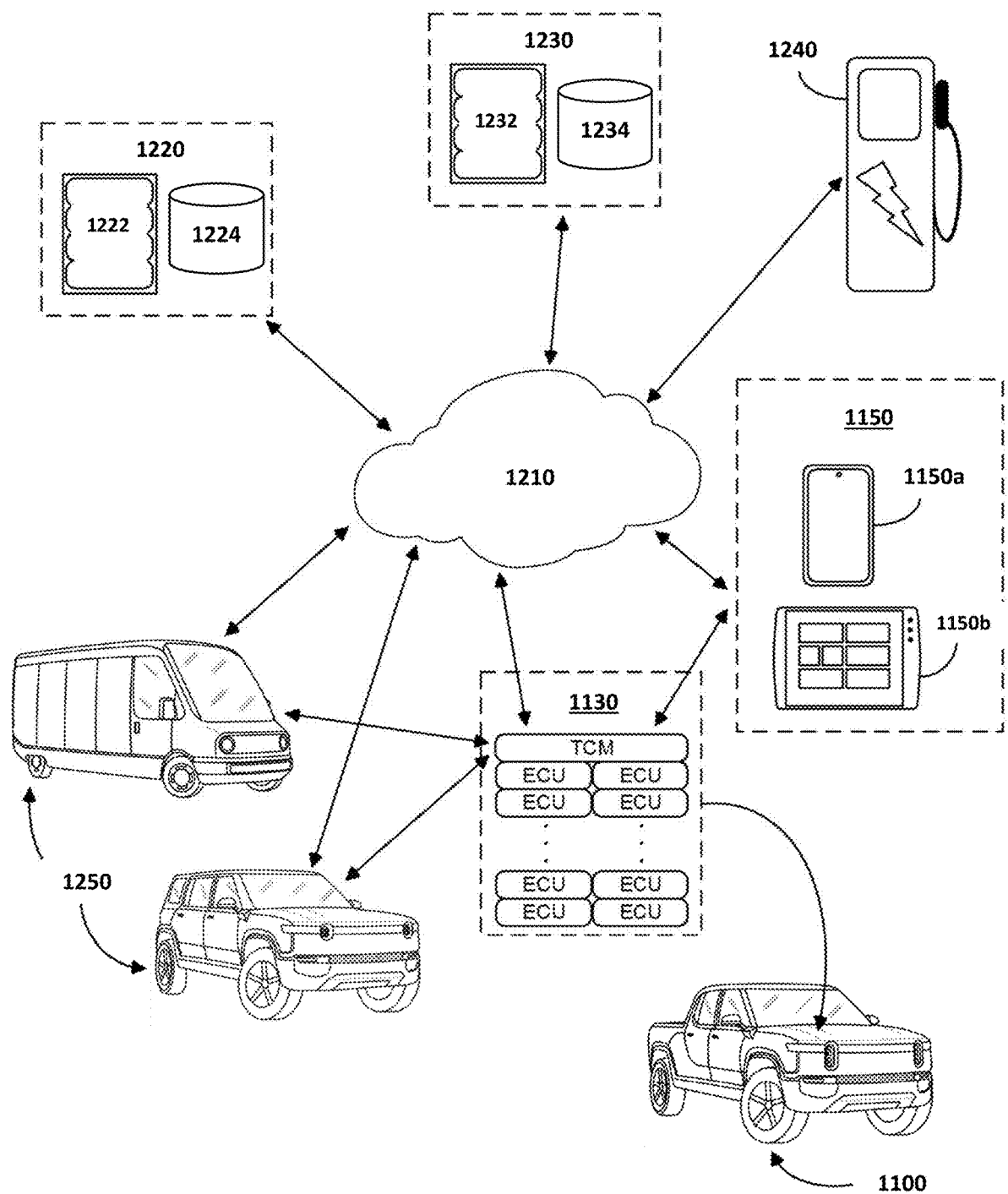
FIG. 12 illustrates an example network system including a connected vehicle, in accordance with various embodiments.

FIG. 12 illustrates an example networked environment 1200. Computer system 1200 may include a connected vehicle 1100 with a control system 1130 that is capable of transmitting data to/from a network 1210. Network 1210 may also be connected to one or more computing servers 1220 (e.g., including compute units 1222 and storage units 1224) associated with a vehicle manufacturer, a vehicle service provider, a vehicle fleet operator, or a vehicle-charging facility provider. Network 1210 may also be connected to one or more third-party computing servers 1230 (e.g., including compute units 1232 and storage units 1234) associated with, for example, a smart accessory manufacturer, a group event organizer, service provider, or a governmental organization. Networked environment 1200 may include one or more landscape features 1240 (e.g., automated toll road sensors, smart road signs or road markers, automated toll gates, power dispensers at charging stations). Networked environment 1200 may also include other connected vehicles 1250 that may be capable of communicating with vehicle 1100 through network 1210 and/or directly with vehicle 1100 (e.g., by communicating with a TCM ECU of a control system 1130 of vehicle 1100 when connected vehicle 1250 is within range of a short-range communications network, such as Bluetooth). Networked environment 1200 may also include one or more computing devices 1150 (e.g., smartphone 1150*a*, a tablet computing device 1150*b*, or a smart vehicle accessory) capable of communicating with network 1210 and/or directly with vehicle 1100.

Networked environment 1200 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 1100 to deduct a toll from a specified account and provides confirmation of the transaction). In particular embodiments, one or more elements of networked environment 1200 may include one or more computer systems, as described in further detail with respect to FIG. 13. In particular embodiments, one or more elements of networked environment 1200 perform one or more steps of one or more methods described or illustrated herein. In particular embodiments, software running on one or more elements of networked environment 1200 may be controlled by a single entity to perform one or more steps of one or more methods described or illustrated herein or provide functionality described or illustrated herein.

Figure 13:
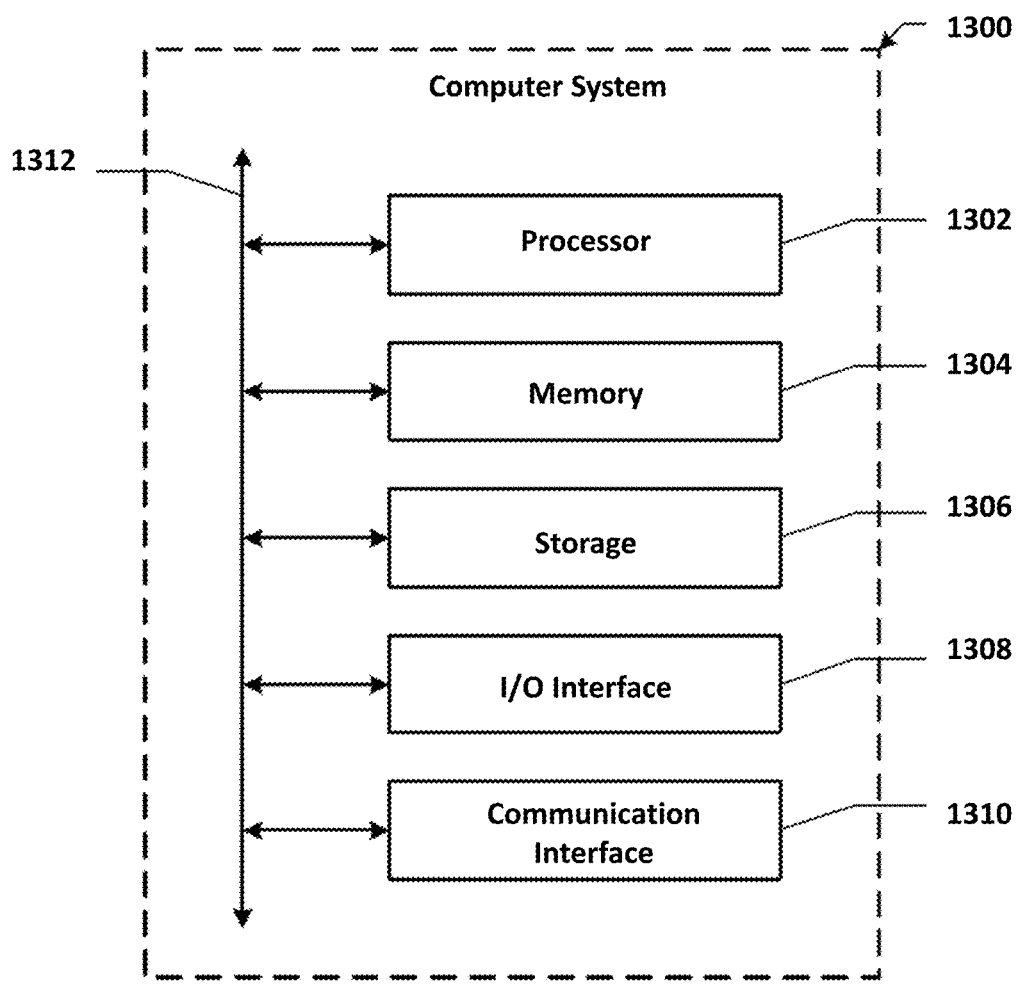
FIG. 13 is a schematic of an example computer system, in accordance with various embodiments.

FIG. 13 illustrates an example computer system 1300. Computer system 1300 may include a process 1302, memory 1304, storage 1306, an input/output (I/O) interface 1308, a communication interface 1310, and a bus 1312. Although this disclosure describes one example computer system including specified components in a particular arrangement, this disclosure contemplates any suitable computer system with any suitable number of any suitable components in any suitable arrangement. As an example and not by way of limitation, computer system 1300 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1300 may include one or more computer systems 1300; be unitary or distributed, span multiple locations, machines, or data centers; or reside in a cloud, which may include one or more cloud components in one or more networks. Where appropriate, computer system(s) 1300 may perform, at different times or at different locations, in real time or in batch mode, one or more steps of one or more methods described or illustrated herein.

Processor 1302 (e.g., compute units 1222 and 1232) may include hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306 (e.g., storage units 1224 and 1234). Processor 1302 may include one or more internal caches for data, instructions, or addresses.

In particular embodiments, memory 1304 includes main memory for storing instructions for processor 1302 to execute or data for processor 1302 to operate on. In particular embodiments, one or more memory management units (MMUs) reside between processor 1302 and memory 1304 and facilitate accesses to memory 1304 requested by process 1302. In particular embodiments, memory 1304 includes random access memory (RAM). This disclosure contemplates any suitable RAM.

In particular embodiments, storage 1306 includes mass storage for data or instructions. As an example and not by way of limitation, storage 1306 may include a removable disk drive, flash memory, an optical disc, a magneto-optical disc, magnetic tape, or a Universal Serial Bus (USB) drive or two or more of these. Storage 1306 may include removable or fixed media and may be internal or external to computer system 1300. Storage 1306 may include any suitable form of non-volatile, solid-state memory or read-only memory (ROM).

In particular embodiments, I/O interface 1308 includes hardware, software, or both, providing one or more interfaces for communication between computer system 1300 and one or more input and/or output (I/O) devices. Computer system 1300 may be communicably connected to one or more of these I/O devices, which may be incorporated into, plugged into, paired with, or otherwise communicably connected to vehicle 1100 (e.g., through the TCM ECU). An input device may include any suitable device for converting volitional user input into digital signals that can be processed by computer system 1300, such as, by way of example and not limitation, a steering wheel, a touchscreen, a microphone, a joystick, a scroll wheel, a button, a toggle, a switch, a dial, or a pedal. An input device may include one or more sensors for capturing different types of information, such as, by way of example and not limitation, sensors 1110 described above. An output device may include devices designed to receive digital signals from computer system 1300 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1308 for them. I/O interface 1308 may include one or more I/O interfaces 1308, where appropriate.

In particular embodiments, communication interface 1310 includes hardware, software, or both providing one or more interfaces for data communication between computer system 1300 and one or more other computer systems 1300 or one or more networks. Communication interface 1310 may include one or more interfaces to a controller area network (CAN) or to a local interconnect network (LIN). Communication interface 1310 may include one or more of a serial peripheral interface (SPI) or an isolated serial peripheral interface (isoSPI). In some embodiments, communication interface 1310 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1312 includes hardware, software, or both coupling components of computer system 1300 to each other. Bus 1312 may include any suitable bus, as well as one or more buses 1312, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

Figure 14:
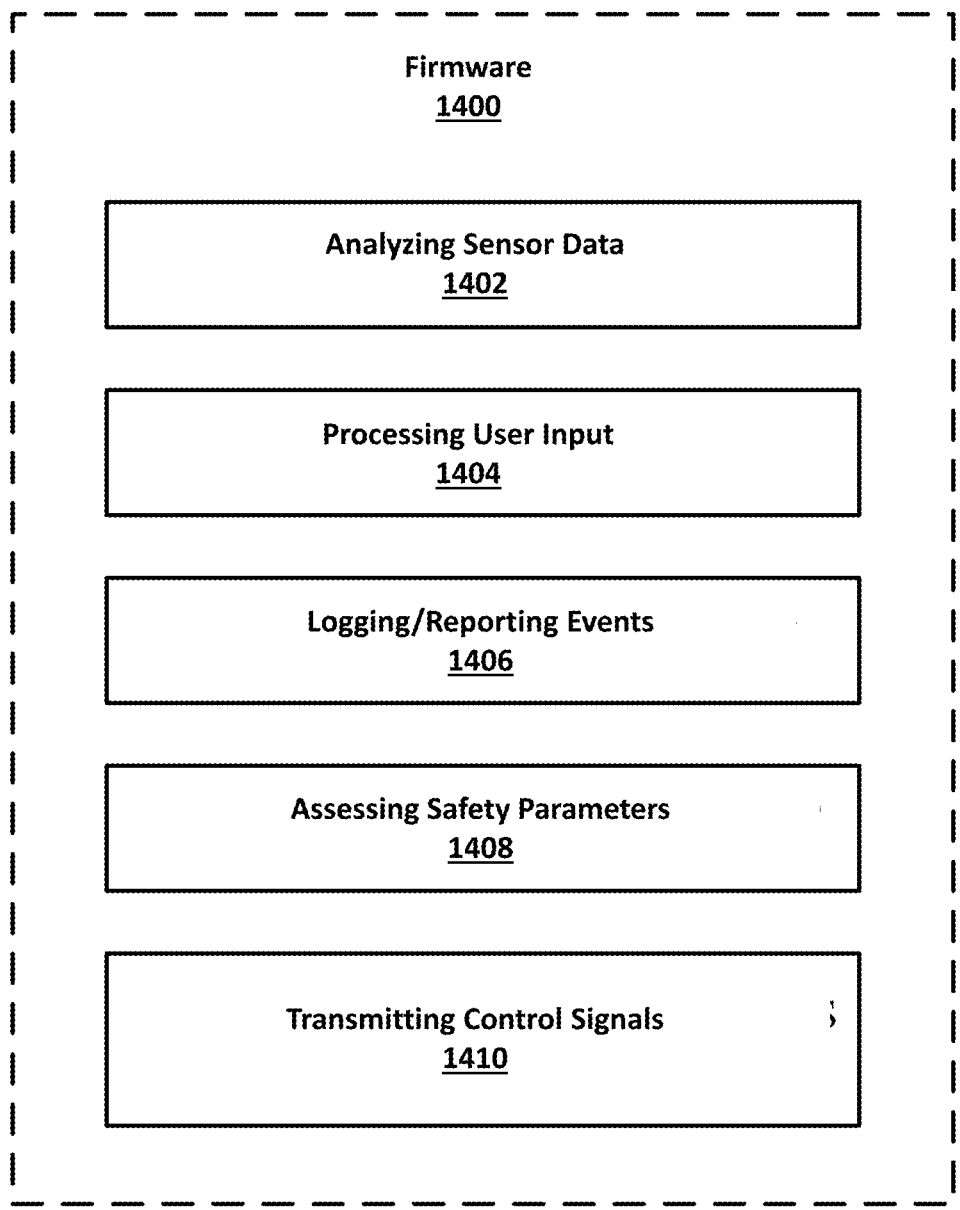
FIG. 14 illustrates example firmware for a vehicle ECU, in accordance with various embodiments.

FIG. 14 illustrates example firmware 1400 for a vehicle ECU as described with respect to control system 1130, in accordance with various embodiments. Firmware 1400 may include functions 1402 for analyzing sensor data based on signals received from sensors 1110 or cameras 1120 received through communication interface 1310. Firmware 1400 may include functions 1404 for processing user input (e.g., directly provided by a driver of or passenger in vehicle 1100, or provided through a computing device 1150) received through I/O interface 1308. Firmware 1400 may include functions 1406 for logging detected events (which may be stored in storage 1306 or uploaded to the cloud), as well as functions for reporting detected events (e.g., to a driver or passenger of the vehicle through an instrument display or interactive interface of the vehicle, or to a vehicle manufacturer, service provider, or third party through communication interface 1310). Firmware 1400 may include functions 1408 for assessing safety parameters (e.g., monitoring the temperature of a vehicle battery or the distance between vehicle 1100 and nearby vehicles). Firmware 1400 may include functions 1410 for transmitting control signals to components of vehicle 1100, including other vehicle ECUs.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Example Embodiments

Embodiments disclosed herein may include:

1. A device comprising: one or more control mechanisms configured to contact a touchscreen of a computing device based on a user invoking the control mechanisms, wherein each control mechanism comprises: at least one conductive element on a first surface of the control mechanism, wherein: the conductive element is capable of activating capacitive touch sensors of the touchscreen, the user physically interacts with the control mechanism to cause the at least one conductive element to contact a first location on the touchscreen, and the first location corresponds to a respective function of a computer program executing on a computing device comprising the touchscreen.

2. The device of embodiment 1, wherein the control mechanism further comprises: a projection element configured to project content rendered by the touchscreen to an exterior surface of the projection element.

3. The device of embodiment 2, wherein the projection element is formed of a fiber optic material having optical enhancement characteristics configured to enhance a visibility of the content to the exterior surface.

4. The device of any one of embodiments 1-3, wherein the control mechanism contacting the touchscreen causes content to be displayed on the touchscreen in a region surrounding the control mechanism.

5. The device of any one of embodiments 1-4, further comprising: a mounting system configured to fixedly couple to the computing device, the control mechanism being disposed within the mounting system.

6. The device of embodiment 5, wherein the mounting system comprises: one or more conductive elements disposed on an inner surface of the mounting system, wherein the conductive elements are configured to contact the touchscreen, and the function of the computer program is determined based on a location of each of the one or more conductive elements on the touchscreen.

7. The device of embodiment 6, wherein the touchscreen displays first content based on the one or more conductive elements being determined to contact the touchscreen at a first location along the touchscreen.

8. The device of embodiment 7, wherein the touchscreen displays second content based on the one or more conductive elements being determined to contact the touchscreen at a second location along the touchscreen.

9. The device of any embodiment 8, wherein the mounting system is capable of being moved about the touchscreen to cause the one or more conductive elements to move from the first location to the second location.

10. The device of any one of embodiments 1-9, wherein the control mechanism further comprises: an adhesive affixed to the at least one conductive element to fixedly couple the control mechanism to the touchscreen.

11. The device of embodiments 1-10, wherein at least a portion of the control mechanism is formed of a non-conductive material, and the at least one conductive element is integrated with the non-conductive material.

12. The device of any one of embodiments 1-11, wherein the control mechanism is a toggle capable of switching between a first position and a second position, a knob configured to be twisted from a first angular position to a second angular position, or a button capable of being depressed to cause the at least one conductive element to contact the touchscreen.

13. The device of any one of embodiments 1-12, wherein the function of the computer program is determined based on at least one of: a quantity of conductive elements or a position of each conductive element disposed along a perimeter of the control mechanism.

14. The device of any one of embodiments 1-13, wherein the one or more control mechanisms comprise at least a first control mechanism and a second control mechanism, the first control mechanism being configured to facilitate execution of a first function of the computer program and the second control mechanism being configured to facilitate execution of a second function of the computer program.

15. A computer-implemented method, comprising: detecting a set of conductive elements contacting a touchscreen at a first location; identifying a control mechanism associated with the set of conductive elements based on the first location and the set of conductive elements; determining a functionality of a computing device with which to provide access via the touchscreen based on the identified control mechanism; and causing content to be rendered by the touchscreen, the content being associated with the functionality, and wherein a region of the touchscreen with which the content is rendered is based on the first location.

16. The method of embodiment 15, wherein: the region comprises an area of the touchscreen covered by the control mechanism; or the region comprises an exterior of the control mechanism.

17. The method of any one of embodiments 15-16, wherein the content is formatted such that it is projected via a projection mechanism to an exterior surface of the control mechanism.

18. The method of any one of embodiments 15-17, further comprising: detecting the set of conductive elements contacting a second location along the touchscreen.

19. The method of embodiment 18, further comprising: causing the content to be rendered at a different region of the touchscreen based on the second location.

20. The method of any one of embodiments 15-19, further comprising: determining an orientation of the control mechanism based on the first location and the set of conductive elements; detecting that a point of contact of each conductive element of the set rotated about an axis defined by the first location; and causing the content to be adjusted based on an angular displacement of each conductive element.

21. The method of any one of embodiments 15-20, further comprising: detecting an additional set of conductive elements contacting a respective set of second locations along the touchscreen.

22. The method of embodiment 21, wherein the additional set of conductive elements is associated with a mounting system for mounting the control mechanism to the touchscreen, and wherein at least one of the control mechanism, the functionality, or the content is determined based on the additional set of conductive elements.

23. The method of any one of embodiments 15-22, wherein the control mechanism comprises a button, a toggle, a knob, or a joystick.

24. The method of any one of embodiments 15-23, further comprising: determining that the control mechanism has moved about the touchscreen based on the set of conductive elements being detected at a second location along the touchscreen; computing a distance that the control mechanism moved based on the first location and the second location; and causing, based on the distance being less than or equal to a threshold distance, the content to be rendered at another region of the touchscreen, the other region being associated with the second location.

25. A computing system, comprising: one or more processors programmed to perform the method of any one of embodiments 15-24.

26. A connected vehicle, comprising: one or more processors programmed to perform the method of any one of embodiments 15-24.

The invention claimed is:

1. A device comprising:
a control mechanism comprising at least one conductive element on a first surface of the control mechanism, the at least one conductive element configured to contact a touchscreen of a computing device based on a user invoking the control mechanism, wherein:
the conductive element is capable of activating capacitive touch sensors of the touchscreen,
the user physically interacts with the control mechanism to cause the at least one conductive element to contact and move along a surface of the touchscreen between a first location on the touchscreen and a second location on the touchscreen,
the at least one conductive element is not in contact with the touchscreen prior to the user physically interacting with the control mechanism to cause the at least one conductive element to contact the first location on the touchscreen, and
the first location corresponds to a respective function of a computer program executing on a computing device comprising the touchscreen.

2. The device of claim 1, wherein the control mechanism further comprises:
a projection element configured to project content rendered by the touchscreen to an exterior surface of the projection element.

3. The device of claim 2, wherein the projection element is formed of a fiber optic material having optical enhancement characteristics configured to enhance a visibility of the content to the exterior surface.

4. The device of claim 1, wherein the control mechanism contacting the touchscreen causes content to be displayed on the touchscreen in a region surrounding the control mechanism.

5. The device of claim 1, further comprising:
a mounting system configured to fixedly couple to the computing device, the control mechanism being disposed within the mounting system.

6. The device of claim 5, wherein the mounting system comprises:
one or more conductive elements disposed on an inner surface of the mounting system, wherein the one or more conductive elements are configured to contact the touchscreen, and the function of the computer program is determined based on a location of each of the one or more conductive elements on the touchscreen.

7. The device of claim 6, wherein the touchscreen displays first content based on the one or more conductive elements being determined to contact the touchscreen at the first location along the touchscreen, and wherein the touchscreen displays second content based on the one or more conductive elements being determined to contact the touchscreen at the second location along the touchscreen, wherein the mounting system is capable of being moved about the touchscreen to cause the one or more conductive elements to move from the first location to the second location.

8. The device of claim 1, wherein the control mechanism further comprises:
an adhesive affixed to the at least one conductive element to fixedly couple the control mechanism to the touchscreen.

9. The device of claim 1, wherein at least a portion of the control mechanism is formed of a non-conductive material, and the at least one conductive element is integrated with the non-conductive material.

10. The device of claim 1, wherein the control mechanism is a toggle capable of switching between a first position and a second position, a knob configured to be twisted from a first angular position to a second angular position, or a button capable of being depressed to cause the at least one conductive element to contact the touchscreen.

11. The device of claim 1, wherein the function of the computer program is determined based on at least one of: a quantity of conductive elements or a position of each conductive element disposed along a perimeter of the control mechanism.

12. A computer-implemented method, comprising:
detecting a first set of conductive elements contacting a touchscreen at a first location;
identifying a first type of control mechanism associated with the first set of conductive elements based on the first location and at least one of a size, a shape, an arrangement, and a quantity of the first set of conductive elements;
determining a first functionality of a computing device with which to provide access via the touchscreen based on the identified first type of control mechanism;
causing content to be rendered by the touchscreen, the content being associated with the first functionality, and wherein a first region of the touchscreen with which the content is rendered is based on the first location;
detecting a second set of conductive elements contacting the touchscreen at a second location;
identifying a second type of control mechanism associated with the second set of conductive elements based on the second location and at least one of a size, a shape, an arrangement, and a quantity of the second set of conductive elements;
determining a second functionality of the computing device with which to provide access via the touchscreen based on the identified second type of control mechanism.

13. The method of claim 12, wherein:
the first region comprises an area of the touchscreen covered by the first type of control mechanism; or
the first region comprises an exterior of the first type of control mechanism.

14. The method of claim 12, wherein the content is formatted such that it is projected via a projection mechanism to an exterior surface of the first type of control mechanism.

15. The method of claim 12, further comprising:
detecting the first set of conductive elements contacting a third location along the touchscreen; and
causing the content to be rendered at a second region of the touchscreen based on the third location.

16. The method of claim 12, further comprising:
determining an orientation of the first type of control mechanism based on the first location and the first set of conductive elements;
detecting that a point of contact of each conductive element of the first set rotated about an axis defined by the first location; and
causing the content to be adjusted based on an angular displacement of each conductive element.

17. The method of claim 12, further comprising:
detecting an additional set of conductive elements contacting a third set of locations along the touchscreen, wherein the additional set of conductive elements is associated with a mounting system for mounting the first type of control mechanism to the touchscreen, and wherein at least one of the first type of control mechanism, the first functionality, or the content is determined based on the additional set of conductive elements.

18. The method of claim 12, wherein the first type of control mechanism comprises a button, a toggle, a knob, or a joystick.

19. The method of claim 12, further comprising:
determining that the first type of control mechanism has moved about the touchscreen based on the first set of conductive elements being detected at a third location along the touchscreen;
computing a distance that the control mechanism moved based on the first location and the third location; and
causing, based on the distance being less than or equal to a threshold distance, the content to be rendered at a second region of the touchscreen, the second region being associated with the third location.

20. A vehicle system comprising:
a touchscreen;
a control mechanism comprising at least one conductive element on a first surface of the control mechanism, the at least one conductive element configured to activate the touchscreen based on a user moving the at least one conductive element in contact with the touchscreen, wherein:
the conductive element is capable of activating capacitive touch sensors of the touchscreen,
the user physically interacts with the control mechanism to cause the at least one conductive element to contact and move along a surface of the touchscreen between a first location on the touchscreen and a second location on the touchscreen,
the at least one conductive element is not in contact with the touchscreen prior to the user physically interacting with the control mechanism to cause the at least one conductive element to contact the first location on the touchscreen, and
the first location corresponds to a respective function of a computer program executing on a computing device comprising the touchscreen;
a plurality of processors; and
one or more computer-readable non-transitory storage media coupled to one or more of the plurality of processors and comprising instructions operable when executed by one or more of the plurality of processors to cause the vehicle system to:
detect the at least one conductive element contacting the touchscreen at the first location;
identify the control mechanism associated with the at least one conductive element based on the first location and the at least one conductive element;
determine a functionality of the computing device with which to provide access via the touchscreen based on the identified control mechanism; and
cause content to be rendered by the touchscreen, the content being associated with the functionality, and wherein a region of the touchscreen with which the content is rendered is based on the first location.

* * * * *